(12) United States Patent
Ma et al.

(10) Patent No.: US 11,121,815 B2
(45) Date of Patent: Sep. 14, 2021

(54) SHARED DATA CHANNEL DESIGN

(71) Applicant: IDAC Holdings, Inc., Wilmington, DE (US)

(72) Inventors: Liangping Ma, San Diego, CA (US); Shahrokh Nayeb Nazar, San Diego, CA (US); Oghenekome Oteri, San Diego, CA (US); Seyed Mohsen Hosseinian, San Diego, CA (US); Mahmoud Taherzadeh Boroujeni, San Diego, CA (US); Frank La Sita, Setauket, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/346,577

(22) PCT Filed: Nov. 2, 2017

(86) PCT No.: PCT/US2017/059643
§ 371 (c)(1),
(2) Date: May 1, 2019

(87) PCT Pub. No.: WO2018/085485
PCT Pub. Date: May 11, 2018

(65) Prior Publication Data
US 2019/0280802 A1 Sep. 12, 2019

Related U.S. Application Data

(60) Provisional application No. 62/474,897, filed on Mar. 22, 2017, provisional application No. 62/454,425, (Continued)

(51) Int. Cl.
*H04W 72/04* (2009.01)
*H04L 1/00* (2006.01)
(Continued)

(52) U.S. Cl.
CPC ......... *H04L 1/008* (2013.01); *H04W 72/0446* (2013.01); *H04W 72/1273* (2013.01); *H04W 76/11* (2018.02)

(58) Field of Classification Search
CPC .............. H04L 1/008; H04W 72/1273; H04W 72/0446; H04W 76/11
See application file for complete search history.

(56) References Cited

U.S. PATENT DOCUMENTS 9,326,277 B2    4/2016   Heo et al.
9,357,420 B2 *  5/2016   Ahn ...................... H04L 5/0007
                         (Continued)

FOREIGN PATENT DOCUMENTS

CN      102150380 A     8/2011
CN      103168441 A     6/2013
                (Continued)

OTHER PUBLICATIONS

3rd Generation Partnership Project (3GPP), TS 36.211 V11.4.0, "3$^{rd}$ Generation Partnership Project; Technical Specification Group Radio Access Network; Evolved Universal Terrestrial Radio Access (E-UTRA); Physical channels and modulation (Release 11)", Sep. 2013, 120 pages.
(Continued)

*Primary Examiner* — Jay P Patel
(74) *Attorney, Agent, or Firm* — Condo Roccia Koptiw LLP

(57) ABSTRACT

Systems, methods and instrumentalities are disclosed for decoding data. For example, it may be determined, in a current slot, whether data received in a previous slot is decoded successfully. The data received in the previous slot may be included in a Physical Downlink Shared Channel (PDSCH). If the data received in the previous slot is not decoded successfully, preemptive multiplexing information
(Continued)

may be detected in a first search space. The data received in the previous slot may be decoded, for example, using detected preemptive multiplexing information. The preemptive multiplexing information may be of a current slot. The preemptive multiplexing information may be comprised in a first DCI. A second search space of the current slot may be searched. For example, the second search space may be searched for a second DCI. The first DCI and the second DCI may be different.

15 Claims, 29 Drawing Sheets

Related U.S. Application Data filed on Feb. 3, 2017, provisional application No. 62/443,457, filed on Jan. 6, 2017, provisional application No. 62/416,620, filed on Nov. 2, 2016.

(51) Int. Cl.
  *H04W 76/11* (2018.01)
  *H04W 72/12* (2009.01)

(56) References Cited

U.S. PATENT DOCUMENTS

| | | | |
|---|---|---|---|
| 9,374,211 | B2 | 6/2016 | Kim et al. |
| 2014/0307676 | A1 | 10/2014 | Heo et al. |
| 2015/0043455 | A1* | 2/2015 | Miklos ............... H04W 8/26 370/329 |
| 2015/0334685 | A1 | 11/2015 | Ji et al. |
| 2016/0142898 | A1* | 5/2016 | Poitau ............... H04W 76/14 370/329 |
| 2016/0302092 | A1* | 10/2016 | Sartori ............... H04L 5/0053 |
| 2016/0380742 | A1* | 12/2016 | Suzuki ............... H04L 5/001 370/280 |
| 2017/0019882 | A1* | 1/2017 | Nimbalker ......... H04W 74/02 |
| 2017/0041904 | A1* | 2/2017 | Suzuki ............... H04L 5/0091 |
| 2017/0135116 | A1* | 5/2017 | Kuchibhotla ..... H04W 72/0406 |
| 2017/0251463 | A1 | 8/2017 | Kwak et al. |
| 2017/0285130 | A1 | 10/2017 | Kim et al. |
| 2017/0310431 | A1 | 10/2017 | Iyer et al. |
| 2017/0332359 | A1* | 11/2017 | Tsai ................... H04B 7/0639 |
| 2017/0359807 | A1 | 12/2017 | Hong et al. |
| 2018/0041225 | A1 | 2/2018 | Park et al. |
| 2018/0063865 | A1* | 3/2018 | Islam ................ H04W 72/044 |
| 2018/0070341 | A1 | 3/2018 | Islam et al. |
| 2018/0092104 | A1 | 3/2018 | Sheng et al. |
| 2018/0098358 | A1* | 4/2018 | Rico Alvarino ...... H04L 5/0092 |
| 2018/0184413 | A1* | 6/2018 | Rong ................. H04W 48/18 |
| 2018/0317198 | A1* | 11/2018 | Lee .................... H04W 68/005 |
| 2018/0343667 | A1* | 11/2018 | Li ..................... H04W 72/0446 |
| 2019/0075580 | A1 | 3/2019 | Chen et al. |
| 2019/0191443 | A1 | 6/2019 | Sano et al. |
| 2019/0281609 | A1 | 9/2019 | Kowalski et al. |
| 2019/0288801 | A1* | 9/2019 | Yang .................. H04L 1/0038 |
| 2019/0320450 | A1 | 10/2019 | Li et al. |

FOREIGN PATENT DOCUMENTS

| | | |
|---|---|---|
| CN | 105979597 A | 9/2016 |
| EP | 1293056 A1 | 3/2003 |
| EP | 2186362 A1 | 5/2010 |
| JP | 2018-511203 A | 4/2018 |
| RU | 2480911 C2 | 4/2013 |
| WO | 01/93479 A1 | 12/2001 |
| WO | 2009/020983 A1 | 2/2009 |
| WO | 2015/179136 A1 | 11/2015 |
| WO | WO 2016/123393 A1 | 1/2016 |

OTHER PUBLICATIONS

3rd Generation Partnership Project (3GPP), TS 36.213 V11.4.0, "3rd Generation Partnership Project; Technical Specification Group Radio Access Network; Evolved Universal Terrestrial Radio Access (E-UTRA); Physical layer procedures (Release 11)", Sep. 2013, 182 pages.

3rd Generation Partnership Project (3GPP), TS 36.212 V13.3.0, "3rd Generation Partnership Project; Technical Specification Group Radio Access Network; Evolved Universal Terrestrial Radio Access (E-UTRA); Multiplexing and channel coding (Release 13)", 140 pages.

3rd Generation Partnership Project (3GPP), R1-1608942, "Multiplexing eMBB and URLLC Transmissions", Sony, 3GPP TSG RAN WG1, Meeting #86bis, Lisbon, Portugal, Oct. 10-14, 2016, 4 pages.

3rd Generation Partnership Project (3GPP), R1-1608957, "URLLC and eMBB frame structure and multiplexing", ZTE, ZTE Microelectronics, 3GPP TSG-RAN WG1, Meeting #86bis, Lisbon, Portugal, Oct. 10-14, 2016, 7 pages.

3rd Generation Partnership Project (3GPP), R1-1608814, "DL Control Channel Related to Multiplexing eMBB and URLLC", Fujitsu, 3GPP TSG RAN WG1 Meeting #86bis, Lisbon, Portugal, Oct. 10-14, 2016, pp. 1-4.

3rd Generation Partnership Project (3GPP), R1-1609059, "Multiplexing URLLC and eMBB in DL", Samsung, 3GPP TSG RAN WG1 Meeting #86bis, Lisbon, Portugal, Oct. 10-14, 2016, pp. 1-5.

3rd Generation Partnership Project (3GPP), R1-162206, "Frame Structure Requirements", Qualcomm Incorporated, 3GPP TSG-RAN WG1 #84b, Busan, Korea, Apr. 11-15, 2016, pp. 1-9.

3rd Generation Partnership Project (3GPP), R1-162590, "Consideration on Multiplexing of Non-sTTI and sTTI in the Same Carrier", Huawei, HiSilicon, 3GPP TSG RAN WG1 Meeting #84bis, Busan, Korea, Apr. 11-15, 2016, 4 pages.

3rd Generation Partnership Project (3GPP), R1-162922, "Discussion on Multiple Access for New Radio Systems", InterDigital Communications, 3GPP TSG-RAN WG1 Meeting #84bis, Busan, Korea, Apr. 11-15, 2016, pp. 1-4.

3rd Generation Partnership Project (3GPP), R1-1706054, "Performance Evaluation of DL eMBB/URLLC Multiplexing", Ericsson, 3GPP TSG-RAN WG1 Meeting #88bis, Spokane, U.S., Apr. 3-7, 2017, pp. 1-5.

3rd Generation Partnership Project (3GPP), TR 36.859 V13.0.0, "Technical Specification Group Radio Access Network, Study on Downlink Multiuser Superposition Transmission (MUST) for LTE (Release 13)", Dec. 2015, pp. 1-48.

3rd Generation Partnership Project (3GPP), TR 38.913 V0.3.0, "Technical Specification Group Radio Access Network, Study on Scenarios and Requirements for Next Generation Access Technologies (Release 14)", Mar. 2016, pp. 1-30.

Dai et al., "Non-Orthogonal Multiple Access for 5G: Solutions, Challenges, Opportunities and Future Research Trends", Software Defined 5G Networks for Anything as a Service, IEEE Communications Magazine, vol. 53, No. 9, Sep. 2015, pp. 74-81.

ITU-R, "IMT Vision-Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

Jin et al., "Bit Division Multiplexing for Broadcasting", IEEE Transactions on Broadcasting, vol. 59, No. 3, Sep. 2013, pp. 539-547.

\* cited by examiner

SHARED DATA CHANNEL DESIGN

CROSS-REFERENCE

This application is the National Stage entry under 35 U.S.C. § 371 of Patent Cooperation Treaty Application PCT/US2017/059643, filed Nov. 2, 2017, which claims the benefit of U.S. Provisional Application No. 62/416,620, filed on Nov. 2, 2016; U.S. Provisional Application No. 62/443,457, filed on Jan. 6, 2017; U.S. Provisional Application No. 62/454,425, filed on Feb. 3, 2017; and U.S. Provisional Application No. 62/474,897, filed on Mar. 22, 2017. The contents of which are hereby incorporated by reference in their entirety.

BACKGROUND

Mobile communications continue to evolve. A fifth generation may be referred to as 5G. A previous (e.g., legacy) generation of mobile communication may be, for example, fourth generation (4G) long term evolution (LTE).

SUMMARY

Systems, methods and instrumentalities are disclosed for a shared data channel. Functional blocks and processing flow for 5G data channels may be implemented, e.g., with a unified architecture for uplink and downlink. Information-carrying filler bits may be utilized, e.g., in code blocks. Uplink and downlink signal processing chains may be variable to accommodate a variety of selectable channel codes, ultra-reliable and low latency communications (URLLC) data insertion and traffic prioritization, hybrid beamforming and waveform selection. Data (e.g., low-latency data such as URLLC) may be inserted into an ongoing transmission (e.g., low-priority such as eMBB). Low-latency traffic may take over resources allocated for other traffic, for example, by one or more of puncturing, superpositioning and multi-user MIMO transmission. Blind decoding may be implemented by an enhanced mobile broadband (eMBB) WTRU and a URLLC WTRU. Uplink grantless (e.g., random-access) URLLC transmission may be multiplexed with (e.g., scheduled) uplink eMBB transmission (e.g., from other WTRUs). Sub-slot MU/SU MIMO switching may be provided.

Systems, methods and instrumentalities are disclosed for decoding data. For example, it may be determined, in a current slot, whether data received in a previous slot is decoded successfully. The data received in the previous slot may be included in a Physical Downlink Shared Channel (PDSCH). If the data received in the previous slot is not decoded successfully, preemptive multiplexing information may be detected in a first search space. The data received in the previous slot may be decoded, for example, using detected preemptive multiplexing information. The preemptive multiplexing information may be of a current slot. The preemptive multiplexing information may be comprised in a first DCI. A second search space of the current slot may be searched. For example, the second search space may be searched for a second DCI. The first DCI and the second DCI may be different.

DETAILED DESCRIPTION

A detailed description of illustrative embodiments will now be described with reference to the various figures. Although this description provides a detailed example of possible implementations, it should be noted that the details are intended to provide examples and in no way limit the scope of the application. These examples and other examples may be implemented in whole or in part with omission and/or additions. Any order presented in examples may be varied where appropriate.

5G may implement a variety of technologies. For example, 5G may implement multiple waveforms for uplink and/or advanced beam management. 5G may be used for ultra-reliable low latency (URLLC). 5G data channels may be different than data channels for LTE/LTE-A/LTE-Pro (e.g., physical uplink shared channel (PUSCH) and physical downlink shared channel (PDSCH)).

Functional blocks and flows for data channels (e.g., PDSCH and PUSCH) that may support 5G technologies may be implemented with a unified architecture for uplink and downlink.

Information-carrying filler bits may be utilized. For example, information-carrying filler bits may be utilized in code blocks.

In an example (e.g., LTE/LTE-A/LTE Pro), a transport block may be segmented into multiple code blocks. The multiple code blocks may have equal size. For example, a transport block may be segmented into multiple code blocks with equal size when the transport block size is greater than a threshold Z (e.g., 6144 bits). The size of one or more code blocks may be different than the size of one or more other code blocks. Filler bits may be added to the one or more code blocks. For example, filler bits may be added to the one or more code blocks to make up the difference for equal size code blocks. Filler bits may be set to NULL (e.g., zero) and/or filler bits may not carry information. In an example (e.g., eMBB), code block size may be large and/or the number of filler bits may be large (e.g., 6136 bits). Having a large code block size and/or a large number of filler bits may waste resources.

Figure 1:
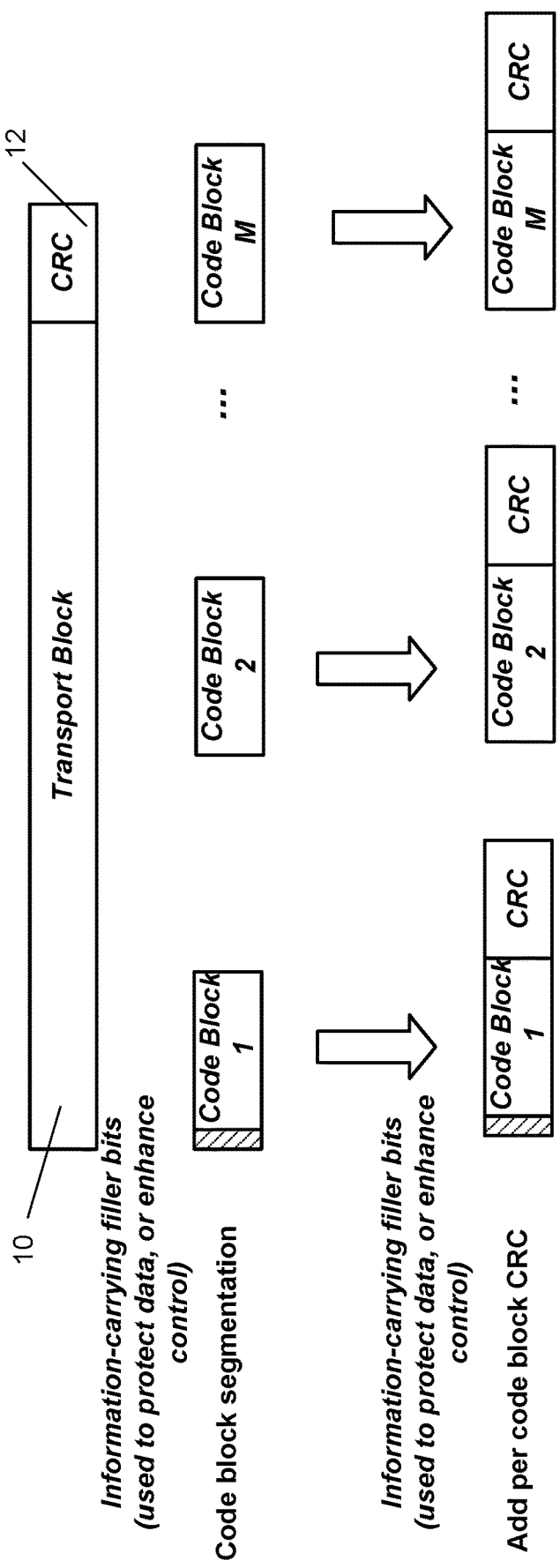
FIG. 1 is an example of code block segmentation and the addition of information-carrying filler bits.

FIG. 1 is an example of code block segmentation and the addition of information-carrying filler bits. Information-carrying filler bits may be used to protect data and/or enhance control signaling. A CRC for a code block that contains filler bits may be calculated. For example, a CRC for a code block that contains filler bits may be calculated using one or more (e.g., all) bits in the code block and/or using non-filler bits in the code block.

As shown in FIG. 1, a transport block 10 may be provided. The transport block 10 may include a cyclic redundancy check (CRC). The transport block 10 may be segmented. For example, the transport block 10 may be segmented into one or more code blocks (e.g., Code Block 1, Code Block 2, Code Block M, etc.). A CRC may be added to one or more of the code blocks. For example, a CRC may be added to one or more of Code Block 1, Code Block 2, Code Block M, etc.

Figure 2:
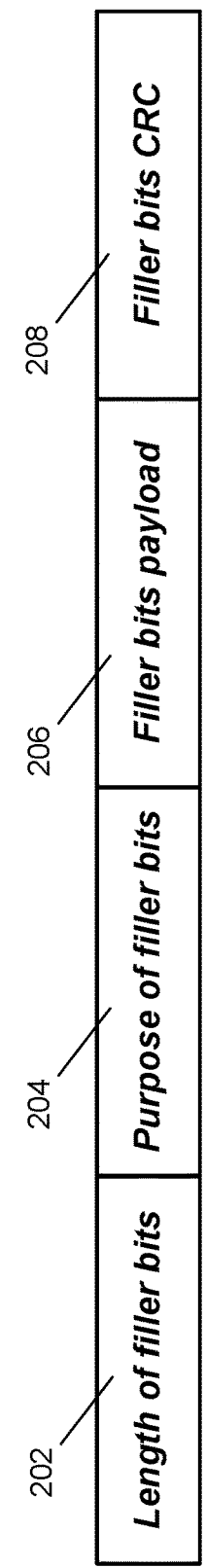
FIG. 2 is an example structure or format for filler bits in a code block.

FIG. 2 is an example structure (e.g., format) for filler bits in a code block. One or more variables may be used to describe filler bits. For example, filler bits may include a length of the filler bits 202, a purpose of the filler bits 204, a payload of the filler bits 206, and/or a CRC of the filler bits 208.

Filler bits cyclic redundancy check (CRC) 208 may be optional. For example, filler bits CRC 208 may not be used when a code block CRC is calculated using filler bits and/or data bits.

A length field 202 of the filler bits may indicate the number of bits in information-carrying filler.

A purpose field 204 of the filler bits may provide an indication. For example, a purpose field of the filler bits 204 may indicate whether a filler bit's payload 206 is for data protection and/or control enhancement.

A filler bit's payload 206 may be one or more of the following. For example, a filler bit's payload 206 may be a repetition of part of the code block (e.g., excluding the CRC), which may serve as side information for a channel decoding algorithm that may operate on a systematic code. A filler bit's payload 206 may be parity check bits (e.g., additional parity check bits) on the data part of a code block. A filler bit's payload 206 may be control information, such as modulation and coding scheme (MCS), resource allocation or channel state information (CSI), and/or feedback for a downlink (DL) and/or uplink (UL) transmission.

A signal processing chain on data channels may be implemented, e.g., to support 5G.

Figure 3:
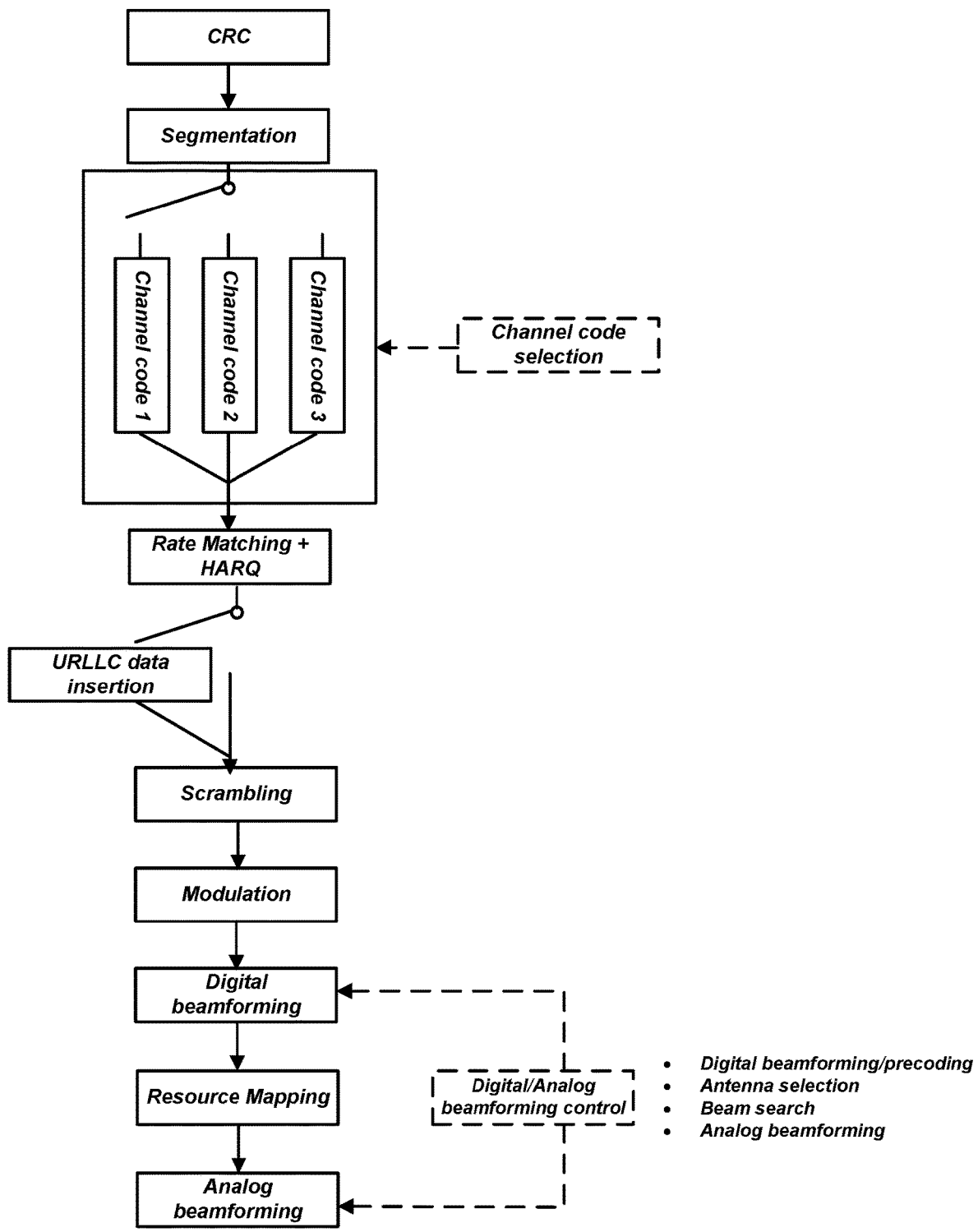
FIG. 3 is an example of a DL-SCH channel processing chain.

FIG. 3 is an example of a downlink shared channel (DL-SCH) channel processing chain. One or more of the following may apply.

A signal processing chain on a data channel may provide a selection of one or more families of channel codes. Families of channel codes may include Turbo code, LDPC code, Polar code, TBCC, etc. Selection criteria may depend on one or more of the following: length of a code block, block error rate (BLER) or bit error rate (BER), encoding latency, decoding latency, power consumption, etc. A channel code selection control module may determine one or more of the channel codes to use.

A URLLC data insertion module may provide prioritized service to URLLC traffic. For example, a URLLC data insertion module may provide prioritized service to URLLC traffic in the midst of serving lower priority traffic. Examples of lower priority traffic may include eMBB traffic, mMTC traffic, etc. URLLC traffic may take over resources that may have been allocated to eMBB traffic (e.g., frequency and time in the case of puncturing) and/or may share the resources (e.g., frequency and time in the case of superposition coding, or space in the case of MU-MIMO between the URLLC WTRU and the eMBB WTRU).

Hybrid beamforming (e.g., the combination of digital beamforming (or precoding) and analog beamforming) may be controlled by a digital/analog beamforming control module. The digital/analog beamforming control module may perform digital beamforming/precoding, antenna selection, beam search, and/or analog beamforming, etc.

An uplink data channel may be implemented, e.g., to support 5G.

Figure 4:
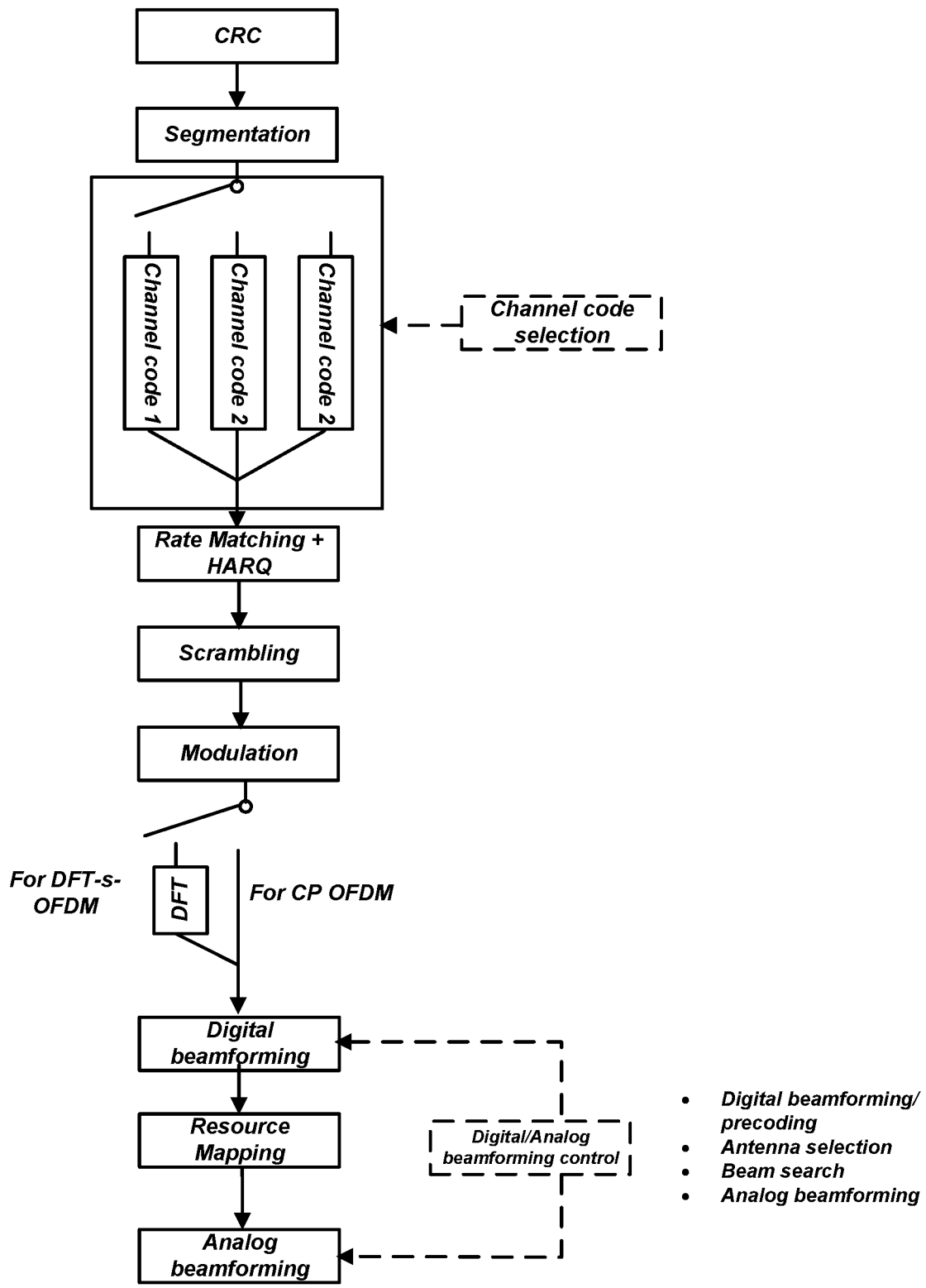
FIG. 4 is an example of a UL-SCH processing chain (e.g., for a PU-SCH channel).

FIG. 4 is an example of a physical uplink shared channel (PUSCH) processing chain). A PUSCH processing chain may be similar to a PDSCH processing chain. A PUSCH chain may have a module for waveform selection (e.g., to select CP OFDM or DFT-s-OFDM). A decision (e.g., about waveform selection) may be made. The decision may be made by an eNB/gNB. For example, the decision may be based on a WTRU's capability and/or the need for coverage.

Data may be inserted into a data transmission (e.g., an ongoing data transmission). The data may be low-latency data. The data may be preemptively inserted into an ongoing data transmission.

Figure 5:
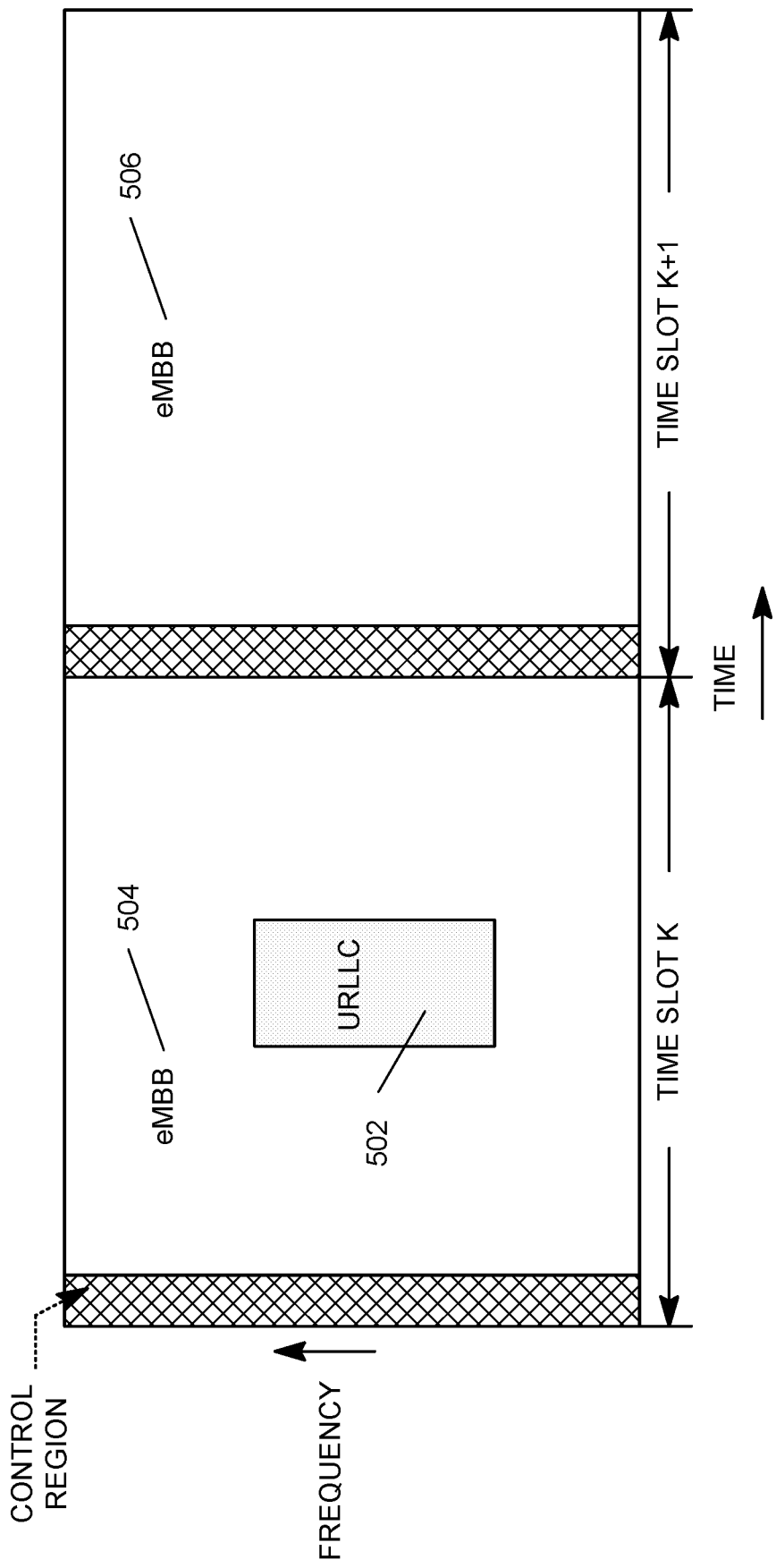
FIG. 5 is an example of insertion of low-latency data (e.g., URLLC) into ongoing low-priority transmission (e.g., eMBB).

FIG. 5 is an example of an insertion of low-latency data (e.g., URLLC) into ongoing low-priority transmission (e.g., eMBB).

Low-latency data may be URLLC traffic. URLLC traffic may include URLLC data 502.

URLLC traffic may have stringent latency requirements. An ongoing data transmission may have lower priority traffic and may be eMBB traffic. In an example, an eNB (or gNB) may be transmitting eMBB data. For example, an eNB (or gNB) may be transmitting eMBB data 504 and/or eMBB data 506. URLLC data 502 may use resources that may have been allocated to the eMBB data (e.g., eMBB data 504). For example, URLLC data 502 may use resources that were allocated to the eMBB data 504 to reduce the latency of the URLLC traffic. The URLLC data may use resources allocated to the eMBB data, for example, to avoid waiting for completion of the ongoing transmission of eMBB data in the current subframe.

Low-latency (e.g., URLLC) traffic may use allocated (e.g., eMBB) resources. For example, low-latency (e.g., URLLC) traffic may use allocated (e.g., eMBB) resources by one or more of the following. Low-latency traffic may use allocated resources by puncturing. Puncturing may include removing eMBB signals from resource regions and/or mapping the URLLC signals to the resource regions. Low-latency traffic may use allocated resources by superpositioning. For example, low-latency traffic may use allocated resources by superposing URLLC signals on top of eMBB signals, or vice versa. Low-latency traffic may superpose URLLC signals on top of eMBB signals, or vice versa, by using superposition coding. Superposition coding may be performed on a symbol-by-symbol basis or on a codeword-by-codeword basis. Low-latency traffic may use allocated resources by multi-user MIMO transmission. MIMO transmission may include sending information on one or more analog or digital spatial beams.

An eMBB WTRU may identify one or more portions of resources being used by URLLC traffic. For example, an eMBB WTRU may identify one or more portions of resources being used by URLLC traffic to decode eMBB data. URLLC traffic may puncture one or more parts of eMBB resources. Puncturing parts of eMBB resources may introduce an erroneous signal at the eMBB receiver. For example, puncturing parts of eMBB resources may introduce an erroneous signal at the eMBB receiver without knowledge about locations of punctured eMBB resources by URLLC traffic to permit an eMBB WTRU to decode the eMBB data.

A URLLC WTRU may identify the location of a URLLC transmission. A control channel may inform the URLLC WTRU of the resource allocation for URLLC transmission.

A system may switch between eMBB directional beams and beams that may accommodate the eMBB transmission and/or URLLC transmission within a single transmission time interval. For example, a hybrid beamforming system (e.g., at mmW frequencies where data transmission may be directional) may switch between eMBB directional beams and beams that may accommodate the eMBB transmission and/or URLLC transmission within a single transmission time interval. An analog beam may be wideband across a transmission channel bandwidth. For example, an analog beam may be wideband across an entire transmission channel bandwidth.

Blind decoding may be implemented by an eMBB WTRU and/or a URLLC WTRU. For example, blind decoding may be implemented by an eMBB WTRU and/or a URLLC WTRU for DL transmission of eMBB data and/or URLLC data. An eMBB WTRU may use blind decoding to determine a portion of a resource that may be allocated to the eMBB WTUR that may have been used by URLLC traffic.

One or more resource regions may be known to one or more (e.g., all) WTRUs and/or a gNB. The resource regions may be reserved for transmission of in-band control information. For example, the resource regions may be reserved for transmission of in-band control information when URLLC traffic is present.

Figure 6:
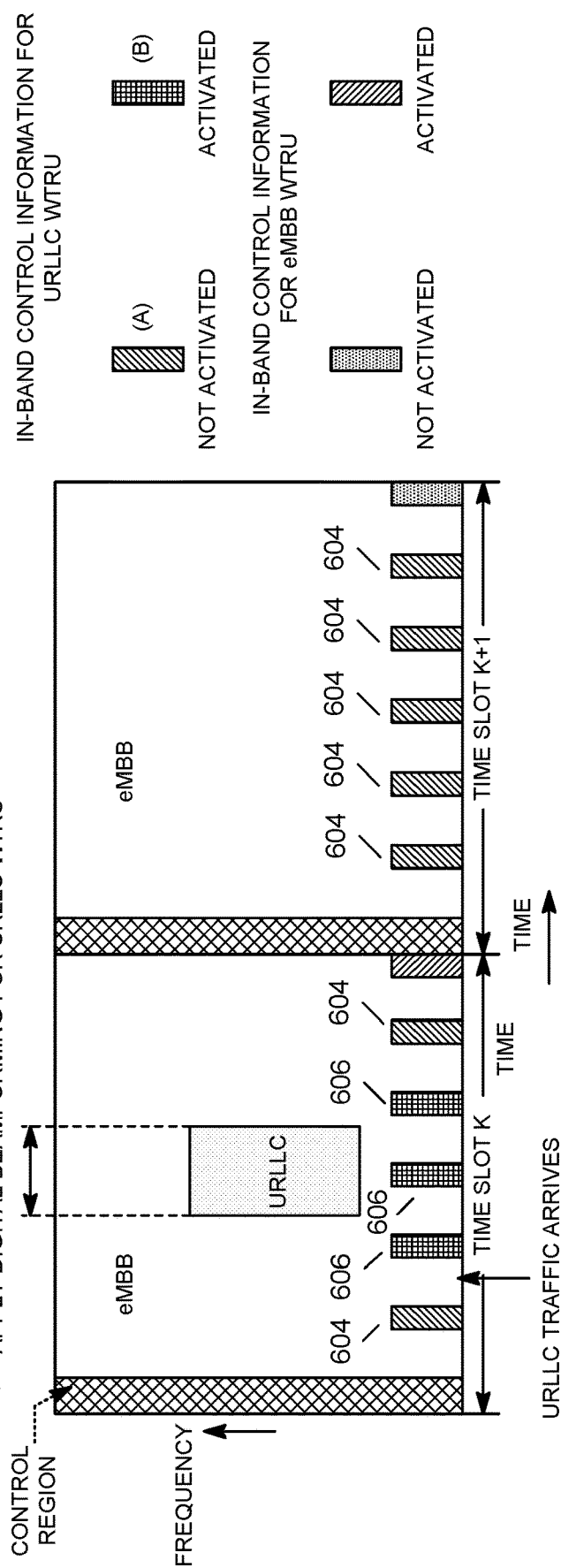
FIG. 6 is an example of periodic in-band control information to indicate which eMBB resource elements are used by URLLC.

The resource that may be used for potential in-band signaling may follow a pattern. The pattern may be known to the transmitter and/or the receiver. The pattern may be periodic or pseudo-random. FIG. 6 is an example of periodic in-band control information. The periodic in-band control information may be used to indicate which eMBB resource elements may be used by URLLC. A sequence of resource regions may be used by the gNB for sending in-band control information to URLLC WTRUs. The sequence of resource regions used by the gNB for sending in-band control information to URLLC WTRUs may be denoted as 604. The URLLC WTRUs may listen for URLLC control information (e.g., possible URLLC control information) in the resource regions. If URLLC traffic arrives, one or more of the regions may get activated. The activated regions may be denoted as 606. If URLLC traffic fails to arrive, the regions may not be activated and/or may be used for eMBB transmission.

An eMBB WTRU may decode data. For example, the eMBB WTRU may decode data without considering the presence of URLLC data. An eMBB WTRU may trigger a search for in-band control information. For example, an eMBB WTRU may trigger a search for in-band control information when decoding fails. A search may incur processing time overhead. Overhead may be limited. For example, overhead may be limited when URLLC traffic is sporadic and/or a channel condition (e.g., without preemptive URLLC transmissions) is benign.

Figure 7:
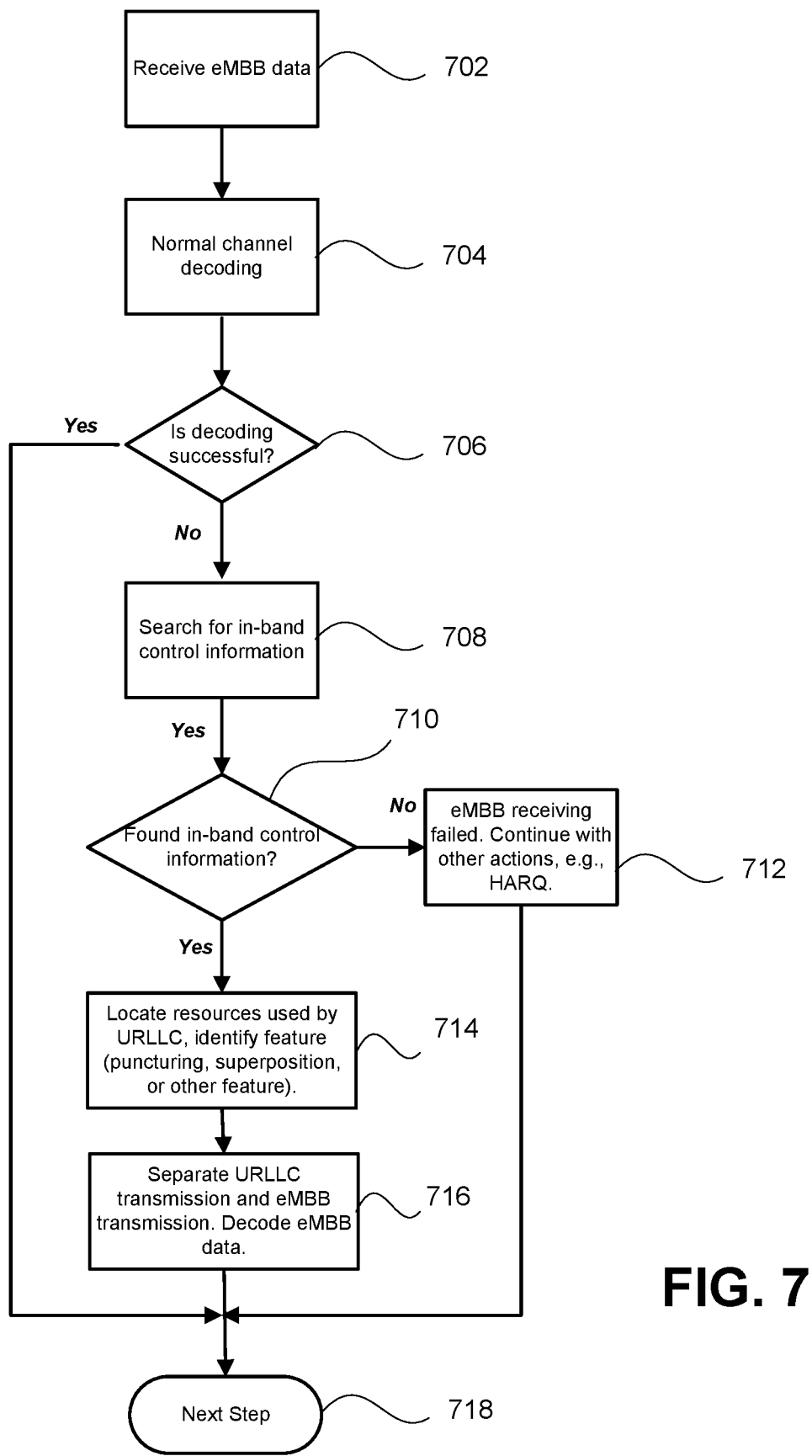
FIG. 7 is an example of blind decoding at an eMBB WTRU.

FIG. 7 is an example of an eMBB WTRU for blind decoding. One or more of the following may be performed.

An eMBB WTRU may receive eMBB data, at 702. The eMBB WTRU may (e.g., may first) attempt to decode the eMBB data. For example, the eMBB WTRU may perform channel decoding (e.g., normal channel decoding), at 704. The eMBB WTRU may (e.g., may first) attempt to decode the eMBB data without determining the presence of URLLC traffic. The URLLC traffic may be added to the eMBB transmission by puncturing, superposition, and/or another feature.

It may be determined, at 706, whether the decoding is successful. If the decoding is successful, the eMBB data receiving may be complete.

The eMBB decoding may be unsuccessful (e.g., may fail). For example, an unsuccessful (e.g., failed) eMBB decoding may lead to a determination (e.g., a determination by an eMBB WTRU) of whether a failure is caused by the presence of URLLC data. The determination of whether a failure is caused by the presence of URLLC data may be performed by an eMBB WTRU. An eMBB WTRU may search an in-band control information region, at 708, if eMBB decoding is unsuccessful. For example, an eMBB WTRU may search an in-band control information region in the resource grid for in-band control information (e.g., potential in-band control information). An in-band control information region may consist of a number (e.g., a fixed number) of resource elements. An in-band control information region may use a pre-defined MCS. An in-band control information may contain a CRC computed using the in-band control information and/or an identifier (e.g., the RNTI) of the eMBB WTRU, which may allow an eMBB WTRU to determine whether the eMBB's decoding of the in-band control information is correct. A successful decoding may be determined using one or more factors. For example, a decoding may be determined to be a success when a CRC check passes.

It may be determined whether in-band information has been found, at 710. If the in-band control information is not found, it may be determined that eMBB receiving has failed, at 712. If the in-band control information is not found, continue with one or more other actions. For example, if the in-band control information is not found, continue with HARQ, etc.

An eMBB WTRU may find (e.g., identify) in-band control information. An eMBB WTRU may follow instructions provided by in-band control information. For example, if in-band control information is found, an eMBB WTRU may follow instructions provided by in-band control information to locate resource elements that may be used by URLLC traffic, at 714. The eMBB WTRU may identify one or more types of features provided and/or used. For example, the eMBB WTRU may identify puncturing, superposition, multi-user MIMO, etc.

An eMBB WTRU may separate a URLLC transmission and an eMBB transmission, at 716. An eMBB WTRU may decode the eMBB data. An eMBB WTRU may skip a punctured part of the eMBB signal. For example, for puncturing, an eMBB WTRU may skip a punctured part of the eMBB signal. An eMBB WTRU may recover eMBB data symbols on the resource grid used by the URLLC traffic. For example, for superposition coding, an eMBB WTRU may recover eMBB data symbols on the resource grid used by the URLLC traffic. Recovery may be performed on one or more bases. For example, recovery may be performed on a per symbol basis and/or on a per codeword basis.

Blind decoding may be implemented using other features. For example, blind decoding may be implemented using one or more features with the same, or different, flow and/or ordering.

Figure 8:
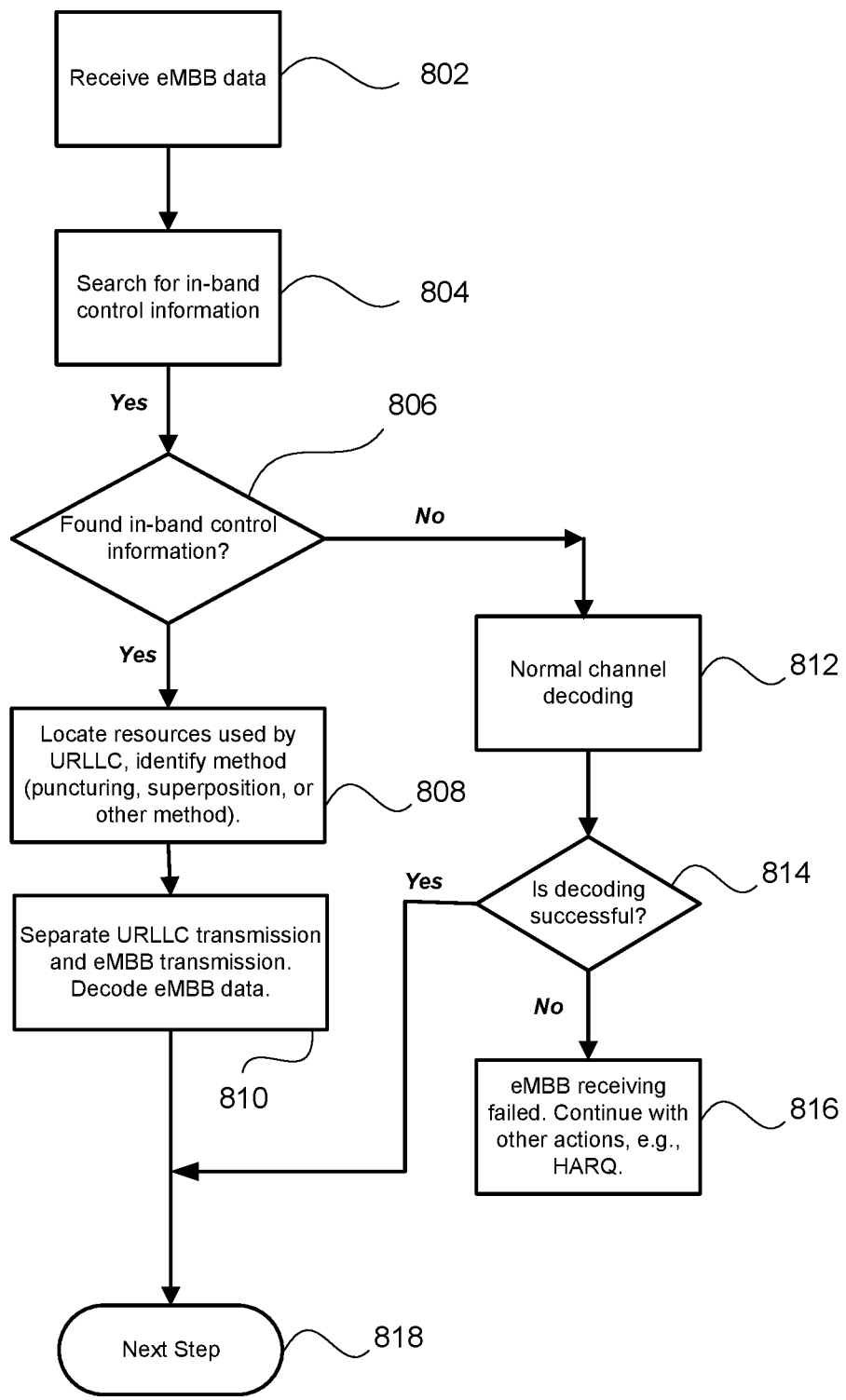
FIG. 8 is an example of for blind decoding at an eMBB WTRU.

FIG. 8 is an example of an eMBB WTRU for blind decoding. One or more of the following may be performed.

For example, a large amount of URLLC traffic may exist. An eMBB receiver may implement one or more (e.g., different) decoding orders. For example, an eMBB receiver may implement one or more (e.g., different) decoding orders by selecting from one or more (e.g., one or more different) decodings and/or by reordering a feature.

An eMBB receiver may perform a blind decoding of an in-band control information. For example, an eMBB receiver may perform a blind decoding of an in-band control information before, or alternative to, a blind decoding of eMBB data. An eMBB WTRU may receive eMBB data, at 802. The eMBB WTRU may search for in-band control information, at 804. The eMBB WTRU may determine, at 806, whether in-band control information is found.

An eMBB receiver may find in-band control information, at 808. An eMBB receiver may follow instructions that may be provided by in-band control information. For example, an eMBB receiver may follow instructions that may be provided by in-band control information to locate resource elements that may be used by URLLC and/or to identify one or more types of features provided and/or used, at 808. Features may include one or more of puncturing, superposition, multi-user MIMO, etc. An eMBB WTRU may separate a URLLC transmission and an eMBB transmission. An eMBB WTRU may decode the eMBB data. The eMBB receiver may separate a URLLC transmission and/or an eMBB transmission, at 810. The eMBB receiver may decode eMBB data.

At 812, channel decoding (e.g., normal channel decoding) may be performed, e.g., if the eMBB receiver does not find in-band control information. It may be determined whether decoding was successful, at 814. At 816, determine that eMBB receiving failed, e.g., if the decoding is unsuccessful. The eMBB receiver may continue with one or more other actions (e.g., HARQ, etc.).

An eMBB receiver may determine whether to perform a blind decode of an in-band control channel. For example, an eMBB receiver may determine whether to perform a blind decode of an in-band control channel for the URLLC and/or the eMBB data. A receiver may track the URLLC insertion statistics. The receiver may switch at a predefined threshold.

A TRP may reserve a specific region in a (e.g., each) scheduling interval. For example, a TRP may reserve a part of the in band control information in a (e.g., each) scheduling interval. A TRP may send a signal indicating the presence of URLLC insertion. A receiver may check for an indication. For example, a receiver may check for an indication before the start of the reception.

Figure 9:
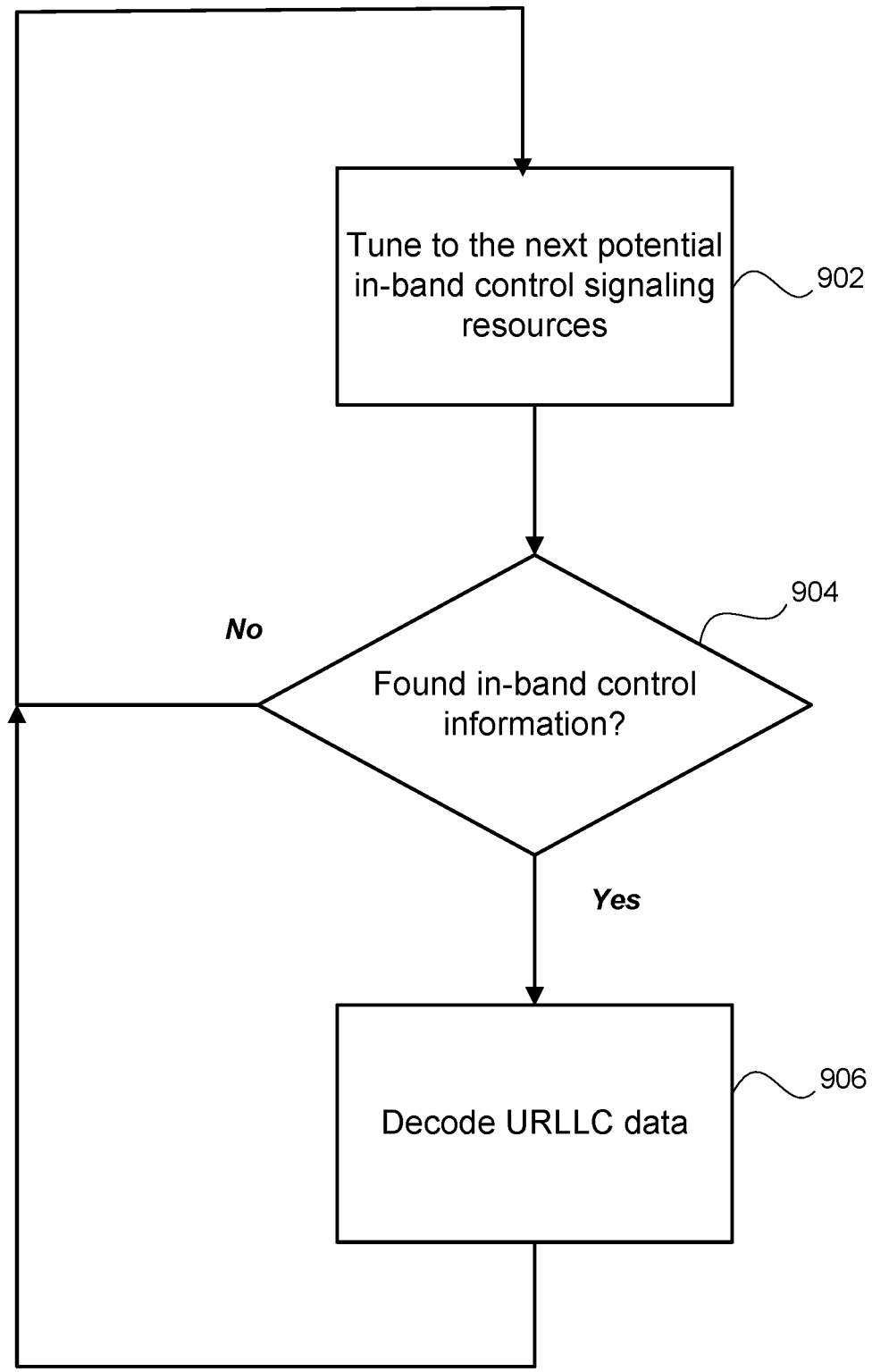
FIG. 9 is an example of blind decoding of in-band control information at the URLLC WTRU.

FIG. 9 is an example of a URLLC WTRU for blind decoding of in-band control information. One or more of the following may be performed.

A URLLC receiver may listen (e.g., may continue listening) to resource elements. For example, a URLLC receiver may tune to in-band control signaling resources (e.g., potential in-band control signaling resources), at 902. The URLLC receiver may listen to resource elements that may be allocated for in-band control information. It may be determined, at 904, whether in-band information has been found. A URLLC receiver may find in-band control information. If in-band information is found, decode URLLC data, at 906. If in-band information is not found, tune to potential in-band control signaling resources, at 902.

A URLLC receiver may follow the information. For example, a URLLC receiver may follow the information to locate resource elements and/or may determine how to receive URLLC data. The URLLC receiver may use superposition coding to receive URLLC data.

Figure 10:
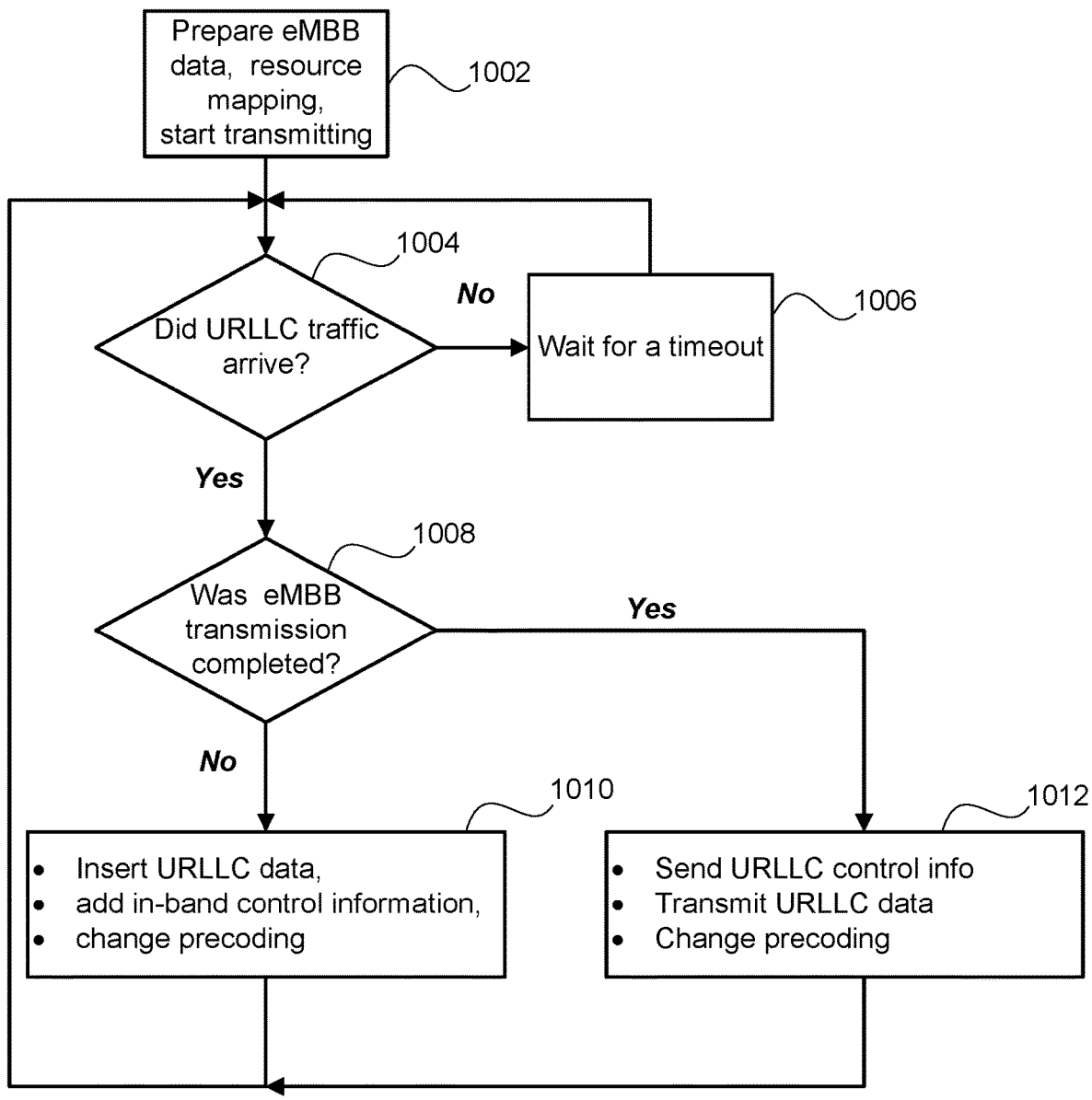
FIG. 10 is an example of inserting URLLC into eMBB transmission at an eNB/gNB/TRP.

FIG. 10 is an example of an eNB/gNB/TRP for inserting URLLC into eMBB transmission. One or more of the following may be performed.

At 1002, eMBB data may be prepared and/or one or more resources may be mapped. Transmitting may begin. It may be determined, at 1004, whether URLLC traffic has arrived. At 1006, wait for a timeout, e.g., if URLLC traffic did not arrive.

Determine if eMBB transmission has completed, at 1008, if URLLC traffic has arrived. An eNB/gNB/TRP may perform URLLC data insertion, at 1010, if eMBB transmission has not completed. For example, an eNB/gNB/TRP may perform URLLC data insertion when URLLC traffic arrives during an ongoing eMBB transmission. In-band control information may be added and/or precoding may be changed. URLL control information may be sent, at 1012, if eMBB transmission has completed. URLLC data may be transmitted. Precoding may be changed.

Beamforming may be directed (e.g., may only be directed) to an eMBB WTRU. For example, beamforming may be directed (e.g., may only be directed) to an eMBB WTRU when an eNB/gNB/TRP transmits eMBB data (e.g., only eMBB data). A beam may cover multiple (e.g., both) WTRUs. For example, a beam may cover multiple (e.g., both) WTRUs when an eNB/gNB/TRP transmits (e.g., simultaneously transmits) to an eMBB WTRU and URLLC WTRU. An eNB/gNB/TRP may change beamforming.

Beamforming may include one or more parts. For example, beamforming may include a digital beamforming and/or an analog beamforming. An analog beam may be configured to be different sizes. For example, an analog beam may be configured to be wide. The analog beam may be configured to be wide to cover multiple WTRUs. An eNB/gNB/TRP may form digital beams (e.g., separate digital beams). The eNB/gNB/TRP may form digital beams toward multiple WTRUs. An overall beam may be identified by a WTRU. For example, an overall beam identified by a WTRU may be a product of an analog beam modulated by a digital beam. Multiple WTRUs may be covered. The Multiple WTRUs may be covered without losing energy efficiency.

Downlink beamforming with URLLC may be performed. Hybrid beamforming may provide an increased frequency transmission. Hybrid beamforming may combine an analog RF beamformer and a digital baseband beamformer.

A transmitted signal may be represented by Eq. 1:

$$X = B_{Analog} B_{Digital} s \quad \text{Eq. 1}$$

where $B_{Analog}$ may be an analog beamforming matrix, $B_{Digital}$ may be a digital beamforming matrix, and/or s may be an information vector.

An eNB/gNB may change an analog beamforming. For example, an eNB/gNB may change an analog beamforming when URLLC data insertion occurs. An eNB/gNB may change an analog beamforming when URLLC data insertion occurs so that analog beamforming may cover an eMBB WTRU and/or a URLLC WTRU.

Figure 11:
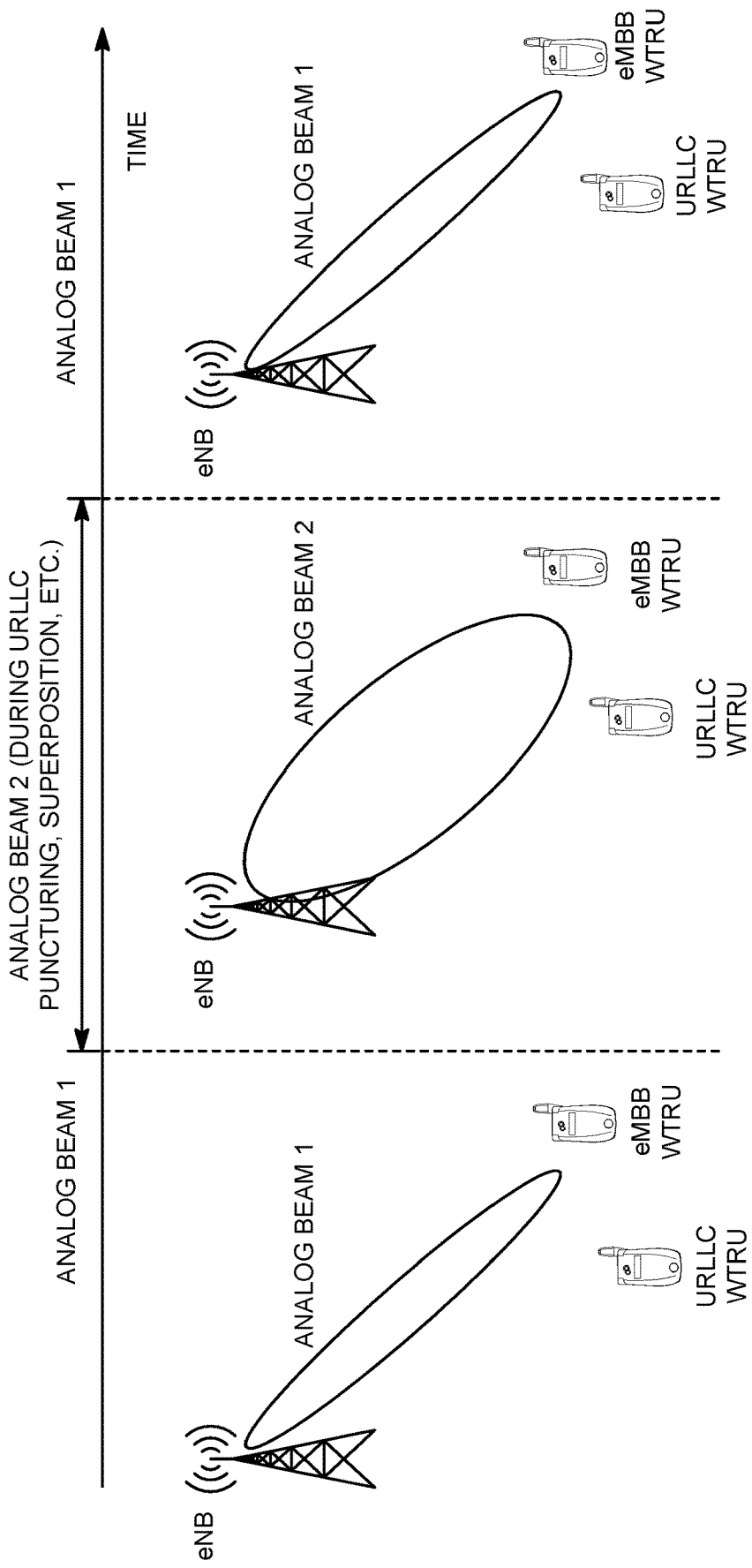
FIG. 11 is an example of dynamically changing analog beamforming as URLLC data insertion takes place.

FIG. 11 is an example of dynamically changing analog beamforming as URLLC data insertion takes place.

In an example (e.g., as shown in FIG. 11), ellipses may represent an analog beam $B_{Analog}$, e.g., The analog beam may be formed over time. For example, the analog beam may be formed dynamically over time. An eNB/gNB may apply different precoders (e.g., digital beamforming) to multiple WTRUs (e.g., eMBB WTRU and a URLLC WTRU). For example, an eNB/gNB may apply different precoders to multiple WTRUs so that overall beams may point to different directions. For example, a beam (e.g., an overall beam) may point to a URLLC WTRU and/or another beam (e.g., another overall beam) may point to an eMBB WTRU. An overall beam may be composed of an analog beam (e.g., as shown by example in FIG. 11) and/or a digital or baseband beam.

Figure 12:
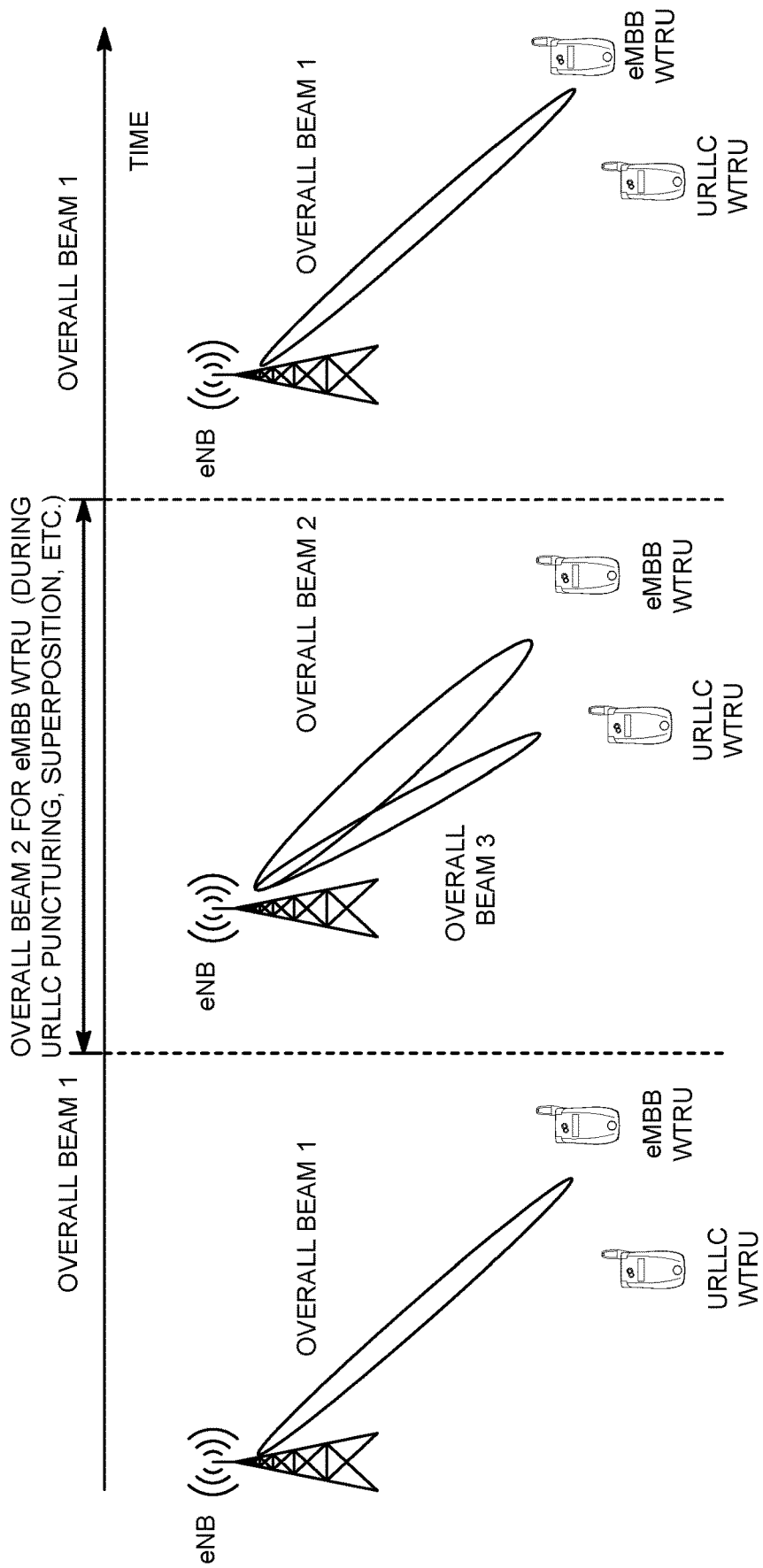
FIG. 12 is an example of dynamically changing an overall beam as URLLC data insertion occurs.

FIG. 12 is an example of dynamically changing an overall beam as URLLC data insertion occurs.

In an example (e.g., as shown in FIG. 12), ellipses may represent an overall beam $B_{Analog} B_{Digital}$ formed (e.g., formed dynamically) over time.

Figure 13:
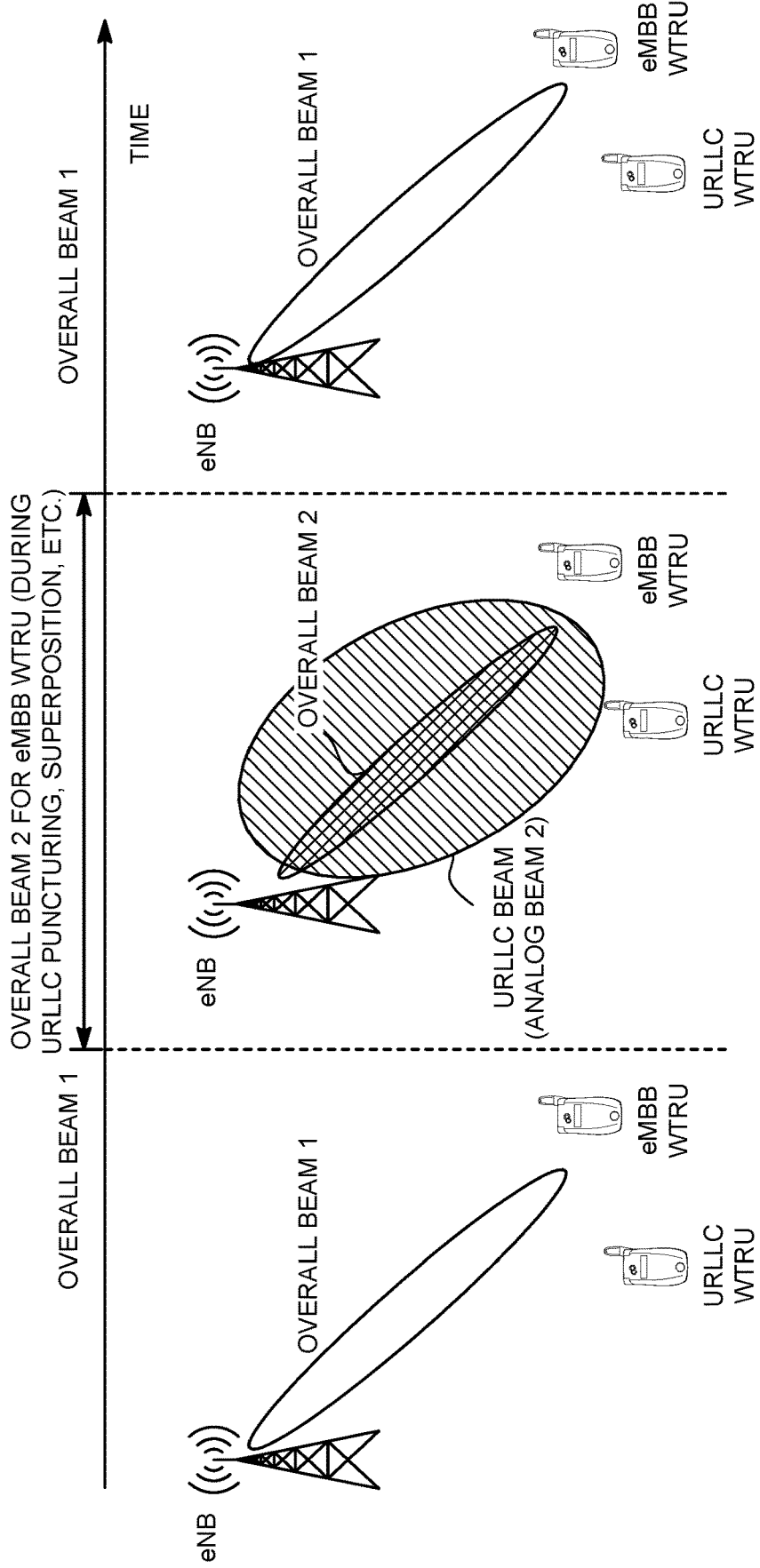
FIG. 13 is an example of dynamically changing an overall beam as URLLC data insertion occurs. A URLLC beam may not have any digital beamforming.

FIG. 13 is an example of dynamically changing an overall beam as URLLC data insertion occurs. As shown in FIG. 13, a URLLC WTRU may use (e.g., may only use) an analog beam. For example, a URLLC WTRU may use (e.g., may only use) an analog beam to reduce a need for feedback. A URLLC beam may not have a digital beamforming.

An analog beam switch may present one or more implementation choices. For example, an analog beam switch may present one or more implementation choices pertaining to a beam sweep, digital precoding feedback, blind decoding, and/or reference symbol.

For a beam sweep, a (e.g., each) WTRU may (e.g., may be required to) identify multiple analog beams. For example, a (e.g., each) WTRU may (e.g., may be required to) identify multiple analog beams during an L1/L2 beam management. An L1/L2 beam management may include a beam search. A WTRU may perform a beam management and/or may identify a predefined analog uplink/downlink beam pair for a (e.g., each) predefined traffic type. In an example (e.g., examples shown in FIGS. 11-13), analog beam 1 may be an eMBB beam and/or analog beam 2 may be a URLLC insertion beam used for eMBB and URLLC transmission. Results from a P-1 level beam management (e.g., coarse beam sweep) may be used for URLLC transmission/reception. Results from P-2/P-3 beam management (e.g., beam refinement) may be used for eMBB transmission.

For digital precoding feedback, a (e.g., each) WTRU may (e.g., may be required to) send feedback that may be needed for a digital baseband precoder for an (e.g., each) analog beam type. Sending feedback that may be needed for a digital baseband precoder for an (e.g., each) analog beam type may involve a feedback (e.g., separate feedback) for a (e.g., each) precoder. One or more parameters may (e.g., may also) be provided. The one or more parameters may include an MCS supportable and/or a transmit power. One or more feedbacks may be needed (e.g., may only be needed) for an eMBB WTRU. For example, one or more feedbacks may be needed (e.g., may only be needed) for an eMBB WTRU for a non-precoded URLLC (e.g., as shown in FIG. 13).

A change in precoders may be taken into account in a blind decoding. Signaling (e.g., explicit signaling) may be used. For example, signaling (e.g., explicit signaling) may be used to reduce the complexity of a blind decoding. Signaling (e.g., explicit signaling) may be used to reduce the complexity of a blind decoding when an eMBB (e.g., a single eMBB) transmission is affected one or more times by URLLC traffic.

Figure 14:
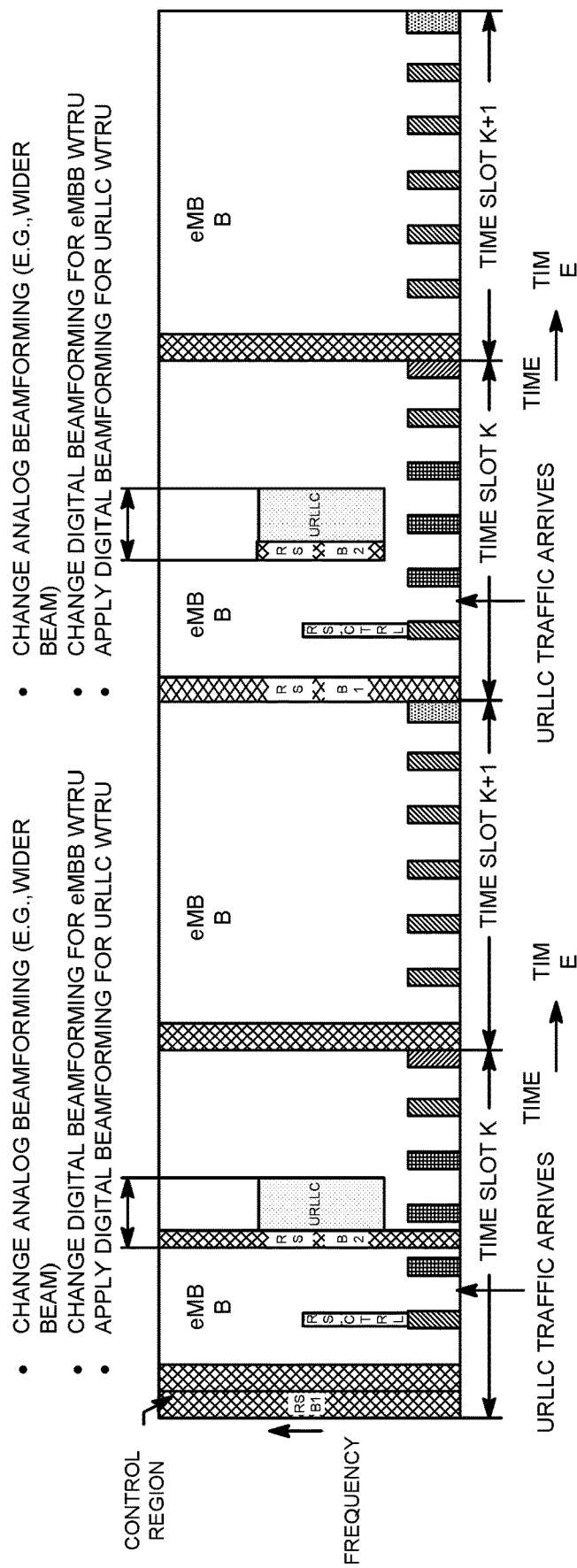
FIG. 14 is an example of RS positioning assuming front-loaded RS.

A reference symbol (RS) may be modified. For example, a reference symbol may be modified to account for changes in beams. An RS signal may be used (e.g., may be needed). For example, an RS signal may be used (e.g., may be needed) when there is a switch in a beam and/or a traffic type. RS1 may be an RS for eMBB Beam 1. RS2 may be an RS for eMBB Beam 2 and/or URLLC Beam2. RS3 may be an RS for URLLC in-band control. RS signals (e.g., with no beamforming) may be used for in-band control information. For example, RS signals (e.g., with no beamforming) may be used for in-band control information given that in-band control information may (e.g., must) be decoded by a URLLC WTRU and/or an eMBB WTRU. FIG. 14 is an example of RS positioning assuming front-loaded RS. In an example (e.g., a front loaded RS signal), an additional RS signal may be used by an eMBB WTRU on a (e.g., a first) beam switch and not after the (e.g., the first) beam switch. RS signals may be used for activated URLLC control and/or data regions.

A TRP may be configured (e.g., statically and/or dynamically configured). For example, a TRP may be configured (e.g., statically and/or dynamically configured) to permit or deny an URLLC transmission. A configuration without URLLC transmission may result in turning off one or more traffic sweep, blind decoding, and/or reference symbol changes.

Figure 15:
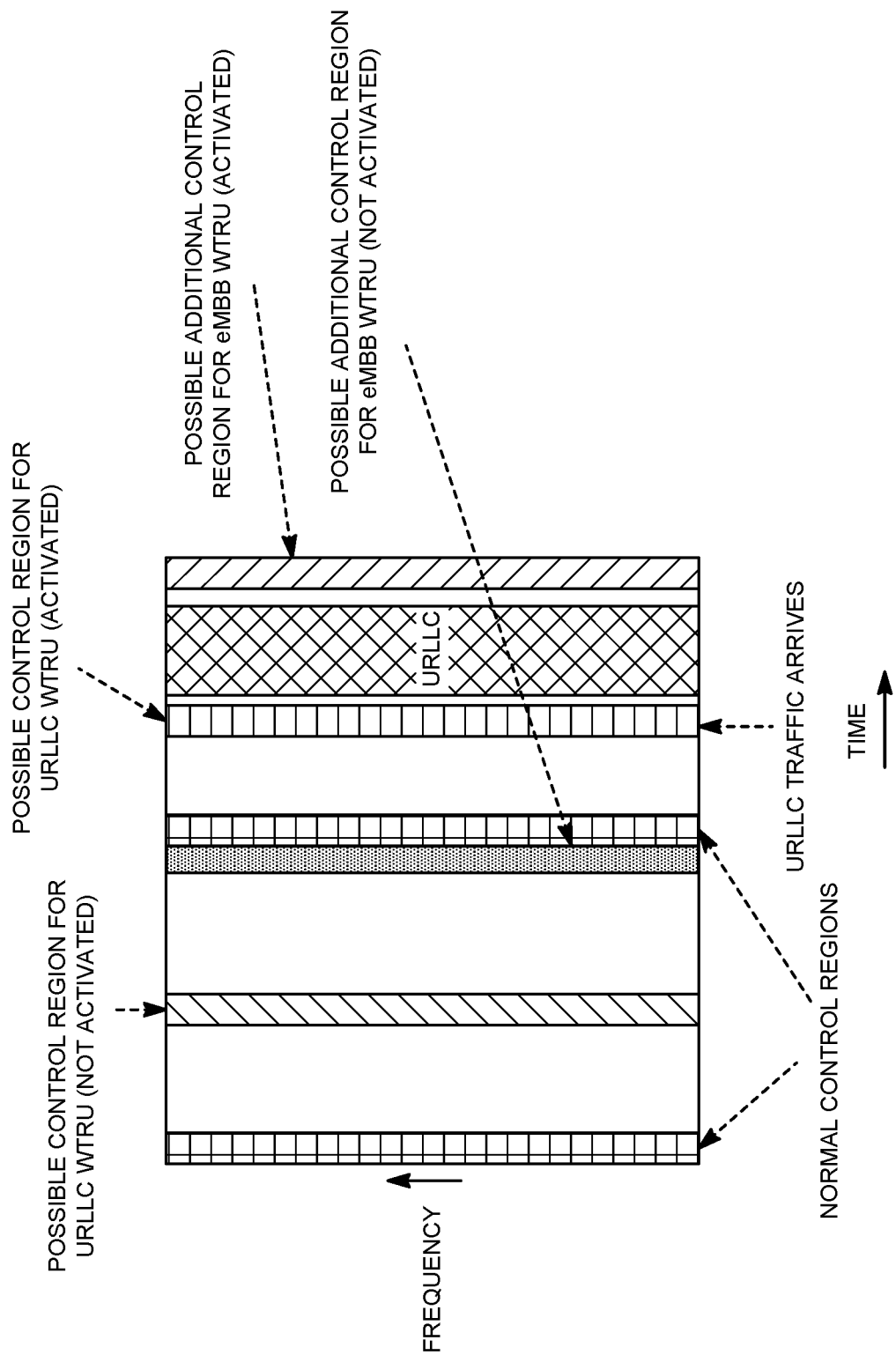
FIG. 15 is an example of using additional control regions.

One or more control regions may be used. The one or more control regions may follow a pattern that may be known to the eNB/gNB/TRP and the WTRU. The pattern may be periodic or pseudo-random. FIG. 15 is an example of using additional control regions. Potential control regions may be allocated. For example, potential control regions may be allocated to inform a URLLC WTRU and an eMBB WTRU about URLLC data insertion.

A device may provide uplink mixed URLLC-eMBB transmissions. A PHY layer of a WTRU may receive URLLC data. For example, a PHY layer of a WTRU may receive URLLC data sent from the WTRU's application layer. A PHY layer of a WTRU may receive URLLC data sent from the WTRU's application layer for uplink transmission while the WTRU is transmitting eMBB data or mMTC data. A WTRU may insert the URLLC data to a transmission (e.g., an ongoing transmission) of eMBB data. For example, a WTRU may insert the URLLC data to the ongoing transmission of eMBB data to reduce latency in serving the URLLC data.

Downlink transmissions may be applicable to (e.g., used for) uplink transmission.

A receive beam at the eNB/gNB/TRP may be switched to a URLLC analog beam. For example, a receive beam at the eNB/gNB/TRP may be switched to a URLLC analog beam for the duration of a determined possible reception period of uplink URLLC traffic.

An uplink grantless (e.g., random-access) URLLC transmission may be multiplexed. For example, an uplink grantless (e.g., random-access) URLLC transmission may be multiplexed with (e.g., scheduled) an uplink eMBB transmission (e.g., from other WTRUs). An eMBB uplink transmission(s) may (e.g., may already) be scheduled. For example, an eMBB uplink transmission may be a grant-based transmission. A WTRU may transmit (e.g., may need to transmit) a URLLC packet without having a grant from an eNB/gNB and/or without knowing a scheduled uplink transmission from eMBB WTRUs. A URLLC uplink transmission may be performed on a time/frequency region (e.g., a portion of a time/frequency region). For example, a URLLC uplink transmission may be performed on a time/frequency region (e.g., a portion of a time/frequency region) that may be assigned for an uplink eMBB transmission. An eNB/gNB may detect (e.g., blindly detect) the URLLC WTRU and/or may separate the URLLC WTRU's data from the data of the scheduled eMBB WTRUs.

Figure 16:
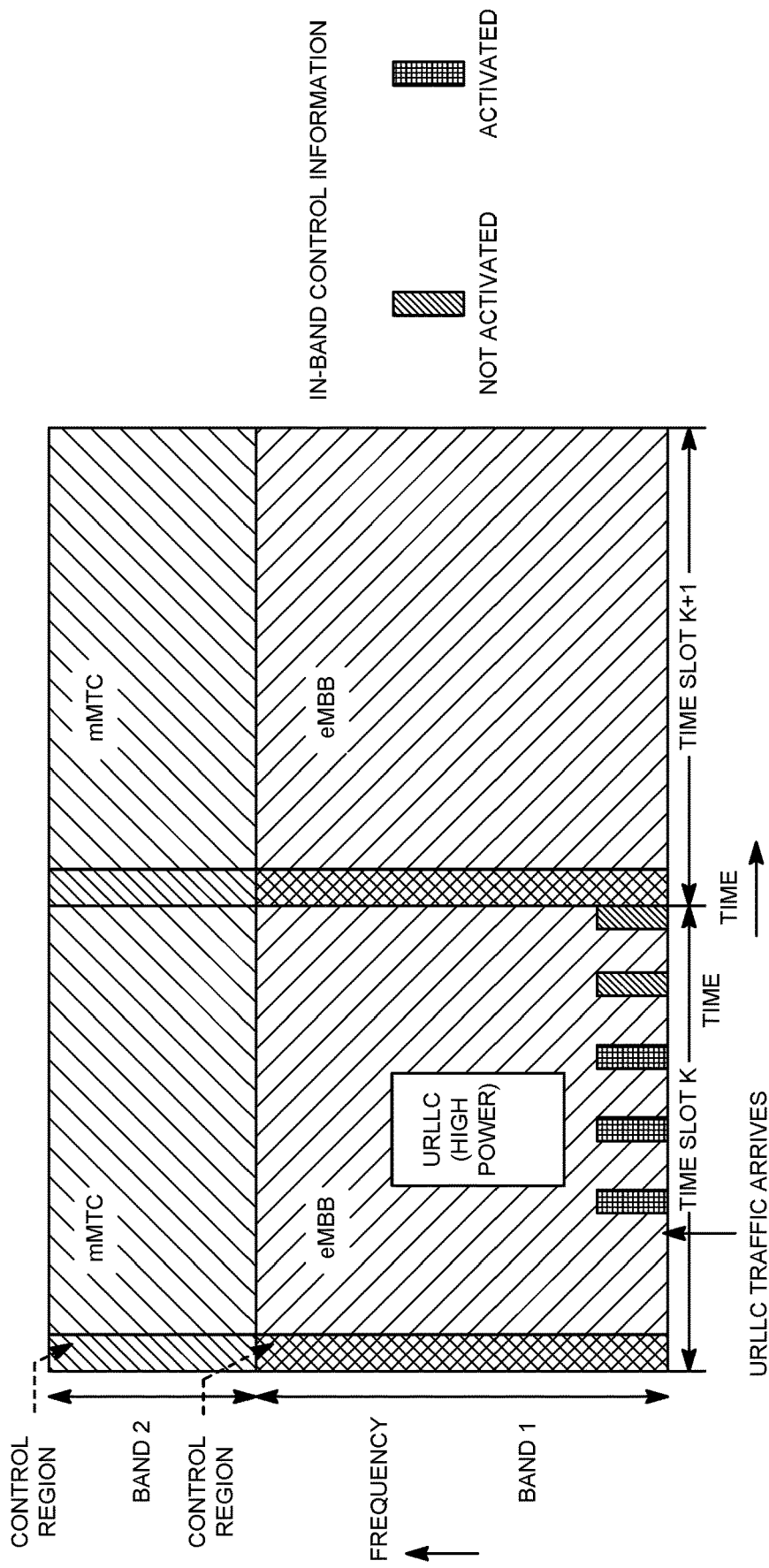
FIG. 16 is an example of URLLC transmission with a boosted power level that overlaps an existing eMBB transmission in an uplink.

FIG. 16 is an example of URLLC transmission with a boosted power level that overlaps an existing eMBB transmission in an uplink. A URLLC transmission may overlap an mMTC resource region. A frequency range may be partitioned into multiple (e.g., two) bands. For example, a frequency range may be partitioned into a band for eMBB and a band for mMTC.

A (e.g., each) URLLC WTRU may be assigned a subset (e.g., a small subset) of a region that may be assigned for an eMBB transmission. The subregion (e.g., small subregion) may be a part of time slot/frame on a frequency subband (e.g., small frequency subband). In the subregion (e.g., the small subregion), an URLLC WTRU may boost the power of the URLLC WTRU. For example, the URLLC WTRU may boost the power of the URLLC WTRU to be dominant over the power of uplink transmission from possible scheduled eMBB WTRUs. In an example, the transmission power for the eMBB transmissions in the subregion may be lowered by a factor X dB (e.g., X=10 dB). The transmission power for the eMBB transmissions in the subregion may be lowered by a factor X dB so the URLLC power may dominate the eMBB power. The URLLC WTRU may not boost the power of the URLLC WTRU. The eMBB WTRU may use a reduced channel coding rate to make the transmission of the eMBB WTRU more robust. A receiver (e.g., a receiver at an eNB/gNB) may detect a transmission from a URLLC user. For example, a receiver (e.g., a receiver at an eNB/gNB) may detect a transmission from a URLLC user by detecting a high power density in a WTRU-specific subregion and/or may use successive interference cancellation (SIC) to detect the data of the URLLC WTRU, remove the data of the URLLC WTRU, and/or detect the eMBB data.

In examples, low-rate CDMA techniques may be used. For example, low-rate CDMA techniques may be used to spread a URLLC user's data over a region (e.g., a part or all of a region). Low-rate CDMA techniques may be used to spread a URLLC user's data over a region (e.g., a part or all of a region) based on a signature assigned to the URLLC user. The code-based spreading may be in frequency (e.g., to limit latency) or in frequency and time. A receiver (e.g., at an eNB/gNB) may monitor (e.g., blindly monitor) a CDMA transmission. For example, the receiver (e.g., at an eNB/gNB) may monitor (e.g., blindly monitor) a CDMA transmission using different signatures (e.g., corresponding to different potential URLLC uplink transmissions) and/or may detect (e.g., blindly detect) the URLLC user. The receiver may use successive interference cancellation (SIC) to detect its data, remove the data, and/or detect the eMBB data.

A gNB may indicate the resources that may be safe to be used For example, a gNB may indicate the resources that may be safe to be used to prevent preemptive UL URLLC transmissions from disrupting transmissions over resources allocated for certain purposes (e.g., critical purposes, such as UL DMRS and/or other URLLC UL transmissions). The resources may include unallocated resources and/or resources allocated for eMBB.

A gNB may pool (e.g., unite) the unallocated resources and/or the resources allocated to one or more (e.g., all) eMBB WTRUs. For example, to limit signaling overhead, a gNB may pool (e.g., unite) the unallocated resources and the resources allocated to one or more (e.g., all) eMBB WTRUs. The gNB may select a subset of resources and/or may provide a descriptor for the subset. The gNB may specify the maximum power boost factor Y dB to limit interference (e.g., Y=23) generated by the URLLC WTRU.

A gNB may send information regarding the subset of resources in a common search space in the Downlink Control Information (DCI). For example, to limit signaling overhead, a gNB may send information regarding the subset of resources in a common search space in the DCI. URLLC WTRUs (e.g., all URLLC WTRUs) may read the information in the common search space. For example, URLLC WTRUs (e.g., all URLLC WTRUs) may read the information in the common search space to avoid signaling overhead associated with sending the information to URLLC WTRUs individually. In an example, the common search space may be for one or more (e.g., all) WTRUs.

A URLLC WTRU may search for a search space in the DCI. For example, the URLLC WTRU may search for the common search space in the DCI. The URLLC WTRU may identify the resources that the URLLC WTRU may superpose upon. A URLLC WTRU may boost the URLLC WTRU's TX power. For example, the URLLC WTRU may boost the URLLC WTRU's TX power by X dB (e.g., X=20), where X≤Y.

Uplink eMBB and grant-based URLLC multiple access may be provided. In the uplink, eMBB transmissions may use normal time slots. A normal time slot may be M OFDM symbols long in time, where M may be an integer. URLLC transmissions may use mini-slots. For example, URLLC transmissions may use mini-slots to achieve shorter latency. A mini-slot may be N OFDM symbols long in time, where N may be an integer and/or N<M.

Canceling a grant and/or the transmission may be costly. For example, it may be costly to cancel the grant and/or the transmission if the gNB schedules resources to an eMBB WTRU for the UL transmission. Cancellation may be possible if the eMBB WTRU monitors the transmissions from the gNB in the DL for one or more (e.g., every) mini-slot. Monitoring may increase the energy consumption on the eMBB WTRU.

Figure 17:
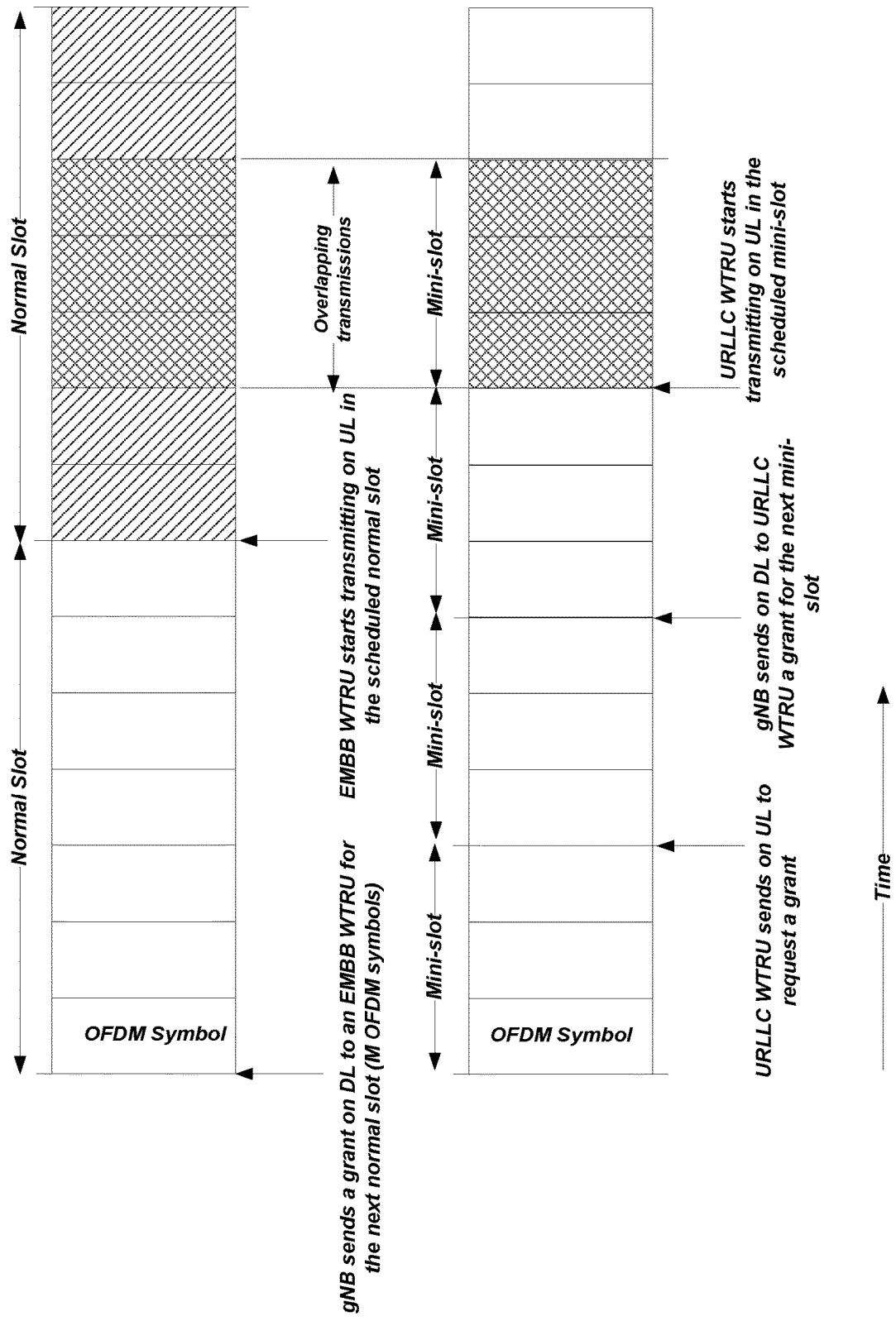
FIG. 17 is an example of a URLLC transmission scheduled on a mini-slot preempting an enhanced mobile broadband (eMBB) transmission scheduled on a normal slot.

If a URLLC WTRU requests a grant for an UL transmission and the grant would arrive after some eMBB WTRUs are scheduled, it may be beneficial (e.g., beneficial for the URLLC WTRU) to transmit (e.g., preemptively transmit) over resources allocated to eMBB transmissions. FIG. 17 is an example of a URLLC transmission scheduled on a mini-slot preempting an eMBB transmission scheduled on a normal slot. In FIG. 17, M=7 and N=3. The URLLC WTRU and the eMBB WTRU may transmit (e.g., transmit simultaneously) in three OFDM symbols.

Figure 18:
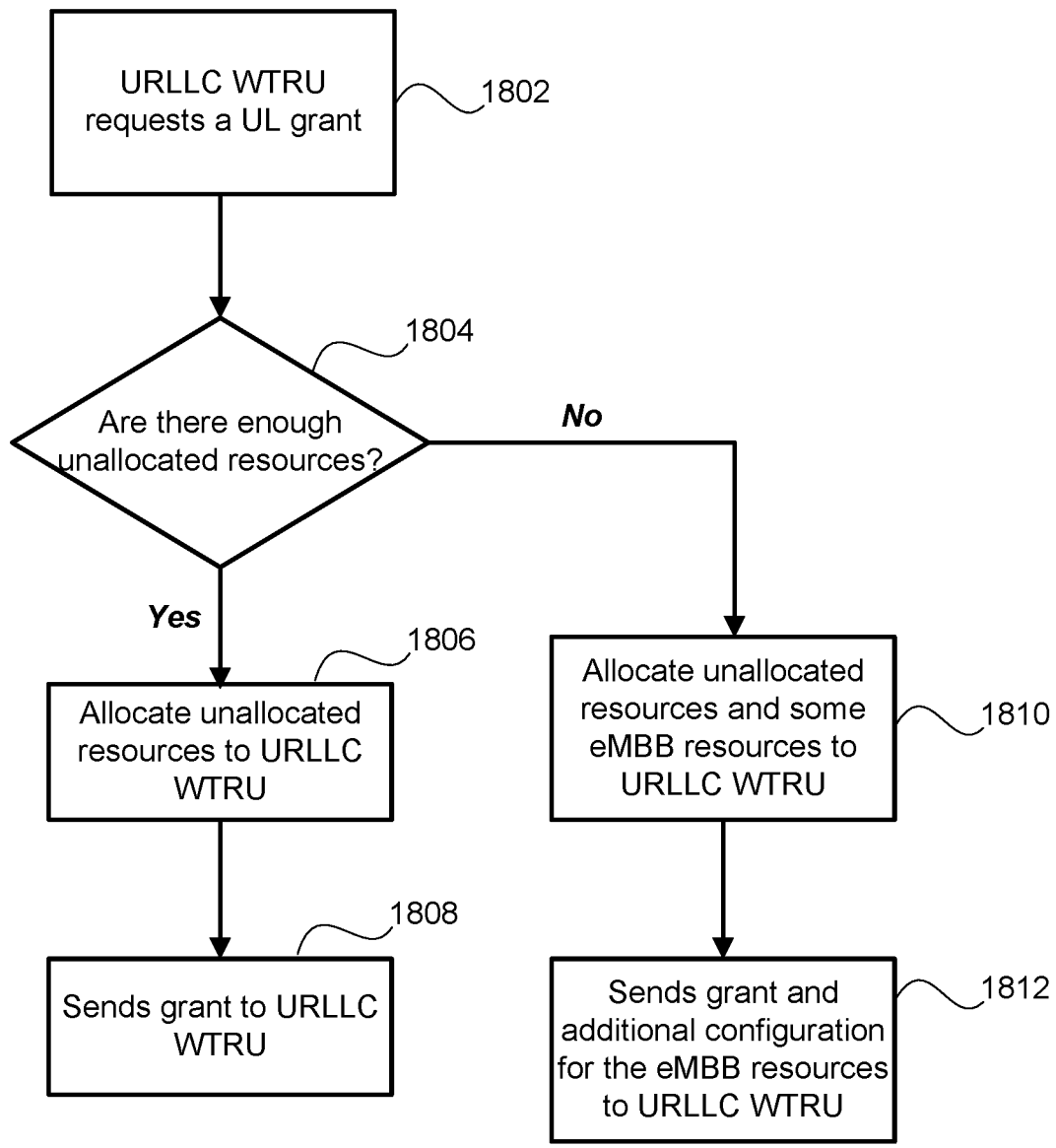
FIG. 18 is an example of a Next Generation NodeB (gNB) for handling a grant request from a URLLC wireless transmit/receive unit (WTRU).

FIG. 18 is an example of a gNB handling a grant request from a URLLC WTRU. In FIG. 18, the gNB may perform resource allocation that may allow for preemptive URLLC transmissions.

The URLLC WTRU may request a UL grant, at 1802. It may be determined if there are enough unallocated resources, at 1804. For example, the gNB may determine whether there are enough unallocated resources for the URLLC WTRU. At 1806, the gNB may allocate unallocated resources to the URLLC WTRU, e.g., if there are enough unallocated resources. The grant may be sent to the URLLC WTRU, at 1808. At 1810, the gNB may allocate the unallocated resources and/or resources that may have been allocated to eMBB WTRUs, e.g., if there are not enough unallocated resources. For example, the gNB may allocate the unallocated resources and/or resources that may have been allocated to eMBB WTRUs to the URLLC WTRU. A grant may be sent, at 1812. In the grant, the gNB may specify a configuration (e.g., a configuration for the eMBB resources) to the URLLC WTRU. The gNB may specify the configuration (e.g., the configuration for the eMBB resources) to the URLLC WTRU to allow for preemptive transmissions (e.g., efficient preemptive transmissions) from the URLLC WTRU.

Preemptive transmission may be achieved by power boosting. For example, the gNB may instruct the URLLC WTRU to boost the URLLC WTRU's transmission power. The gNB may instruct the URLLC WTRU to boost the URLLC WTRU's transmission power to do superposition on top of scheduled eMBB transmissions. The gNB may perform successive interference cancellation (SIC) on the received superposed signals. For example, the gNB may perform successive interference cancellation (SIC) on the received superposed signals to separate the URLLC signal and the eMBB signals. The gNB may send a power control command. For example, the gNB may send a power control command to ask the URLLC WTRU to boost the power by X dB (e.g., X=20). The value of X may be determined by one or more of the received power of the eMBB transmission, the path loss of the URLLC WTRU, and/or a consideration of controlling interference to other WTRUs or nearby cells caused by the URLLC WTRU. The gNB may include the suggested power boost factor in the grant. The URLLC WTRU may increase the URLLC WTRU's transmission power by a factor of X dB.

The gNB may send an indication in the DCI. For example, the gNB may send an indication in the DCI to indicate to the URLLC WTRU that the resource allocated to the URLLC WTRU is being used by eMBB transmissions. The URLLC WTRU may decide on the URLLC WTRU's power boost factor. For example, the URLLC WTRU may decide on the URLLC WTRU's power boost factor based on information such as its remaining battery energy level, path loss, and/or interference.

The gNB may send a precoding matrix index (PMI) to the URLLC WTRU. For example, the gNB may send a precoding matrix index (PMI) to the URLLC WTRU so that the URLLC transmission and the eMBB transmissions may be in orthogonal subspaces at the gNB. The URLLC WTRU may apply the precoding indicated by the PMI for the URLLC WTRU's UL transmission.

Sub-slot MU/SU MIMO switching may be performed. An eNB/gNB/TRP may precode multiple (e.g., two) transmissions in an orthogonal manner. For example, an eNB/gNB/TRP may precode multiple (e.g., two) transmissions in an orthogonal manner to ensure that an eMBB transmission is orthogonal to a URLLC transmission. A channel from an eNB/gNB/TRP to a URLLC WTRU may be $H_1$ and/or a channel to an eMBB WTRU may be $H_2$. Precoders (digital beamforming matrices) $V_1$ and $V_2$ may be chosen for the URLLC WTRU and eMBB WTRU, respectively. An analog beamforming matrix (e.g., a common analog beamforming matrix) B may be chosen. For example, an analog beamforming matrix (e.g., a common analog beamforming matrix) B may be chosen so that $(H_1BV_1)^T H_1BV_2=0$, where the column space of $H_1BV_1$ and that of $H_1BV_2$ may be orthogonal. The URLLC WTRU may extract the URLLC WTRU's desired signal. For example, the URLLC WTRU may extract the URLLC WTRU's desired signal by projecting the received signal $y_1$ to the subspace spanned by $H_1BV_1$. The received signal may be given, for example, by Eq. 2:

$$y_1 = H_1 B(V_1 s_1 + V_2 s_2) \qquad \text{Eq. 2}$$

Different (e.g., two different) analog beamforming matrices $B_1$ and $B_2$ may be created. For example, different (e.g., two different) analog beamforming matrices $B_1$ and $B_2$ may be created so that $H_1B_1$ may be orthogonal to $H_1B_2$. Precoders $V_1$ and $V_2$ may be selected. For example, precoders $V_1$ and $V_2$ may be selected to maximize other criteria. Precoders $V_1$ and $V_2$ may be selected to maximize other criteria without considering the constraint of making the column space of $H_1B_1V_1$ and that of $H_1B_2V_2$ orthogonal. The orthogonality between $H_1B_1$ and $H_1B_2$ may ensure the orthogonality between $H_1B_1V_1$ and $H_1B_2V_2$.

Selection of precoding matrices and beamforming matrices may target optimization of the performance of a URLLC WTRU and an eMBB WTRU. Weights (e.g., different weights) may be applied to objective functions. An overall objective function may be a linear combination of two objective functions for two WTRUs, respectively, for example, in accordance with Eq. 3:

$$\alpha \|(H_1 B V_1)^\dagger H_1 B V_2\| + (1-\alpha)\|(H_2 B V_1)^\dagger H_2 B V_2\| \qquad \text{Eq. 3}$$

where α may be a weight ranging from 0 to 1 and/or † may be the complex conjugate transpose operator and/or ‖ ‖ may be the Frobenius norm.

An eNB/gNB/TRP may utilize channel state information and/or cope with the lack of channel state information in one or more (e.g., one or more different) ways, which may include one or more of the following. For example, the eNB/gNB/TRP may use channel state information obtained from WTRUs in time slots (e.g., previous time slots). The eNB/gNB/TRP may use transmit diversity schemes such as cyclic delay diversity (CDD). For example, the eNB/gNB/TRP may use transmit diversity schemes such as cyclic delay diversity (CDD) when channel state information is unavailable. The eNB/gNB/TRP may initiate a channel measurement and CSI feedback from a URLLC WTRU. Initiating a channel measurement and CSI feedback from a URLLC WTRU may improve the quality of a CSI measurement and may translate into better performance. The eNB/gNB/TRP may initiate a channel measurement and CSI feedback from a URLLC WTRU when URLLC traffic is predictable (e.g., a periodic arrival).

Signaling may be provided for URLLC and eMBB multiplexing. Multi-granularity indications may be provided using mini-slots. A mini-slot may be used for URLLC as the minimum scheduling resource unit. For example, a mini-slot may be used for URLLC as the minimum scheduling resource unit in time domain. A normal time slot may be X number of OFDM symbols. A mini-slot may be Y number of OFDM symbols, where Y<X (e.g., X=7 and Y=2). For example, Y∈{1, 2, . . . , 6} for slots with 7 symbols and Y∈{1, 2, . . . , 13} for slots with 14 symbols. When URLLC traffic is multiplexed (e.g., preemptively multiplexed) with an eMBB transmission (e.g., an ongoing eMBB transmission), the URLLC traffic may occupy (e.g., may need to occupy, such as only occupy) a portion of a normal time slot. The URLLC traffic occupying (e.g., needing to occupy, such as only occupying) a portion of a normal time slot may leave resources (e.g., remaining resources) in the normal time slot.

Figure 19:
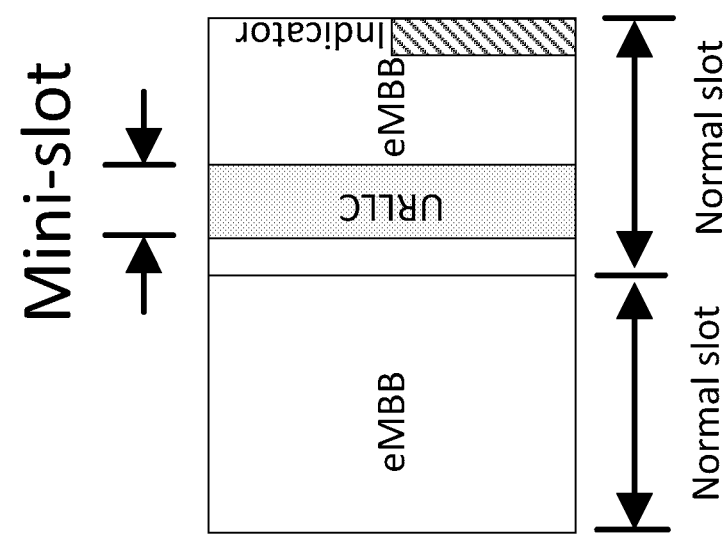
FIG. 19 is an example of indication of preemption in the presence of mini-slots.
Figure 19:
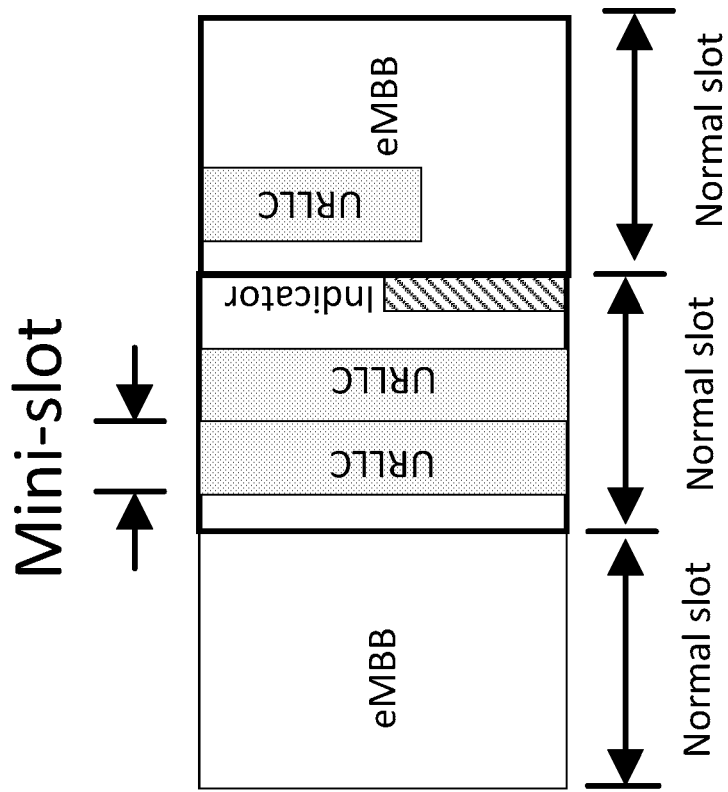

FIG. 19 is an example of an indication of preemption in the presence of mini-slots. The preempted resources may be within the current normal slot and/or may go beyond and into the next normal slot. For example, the preempted resources may be within the current normal slot and/or may go beyond and into the next normal slot if the URLLC data cannot be served (e.g., fully served) in the current normal slot. The gNB may be able to (e.g., may need to be able to) describe the resource usage at the level of a mini-slot. For example, the gNB may be able to (e.g., may need to be able to) describe the resource usage at the level of a mini-slot to let the eMBB WTRU utilize the remaining resources. The gNB may be able to (e.g., may need to be able to) describe the resource usage at the level of multiple mini-slots (e.g., not just at the level of the normal slot). A minimum scheduling resource unit in frequency domain may be an (e.g., one) RB. The URLLC traffic may be multiplexed in the frequency domain over one RB, multiple RBs, and/or a sub-band.

The indication may be at the end of a slot (e.g., the current normal slot). For example, the indication may be at the end of the current normal slot, as shown by the indicator rectangle with hashes in FIG. 19. The indicator may provide one or more of the following information. The indicator may provide information regarding the presence of the URLLC data packet transmission. The indicator may provide information regarding the affected normal slots. For example, a current normal slot may be assigned a number 0, the next normal slot may be assigned a number 1, etc. The indicator may provide information regarding the mini-slot time unit. The mini-slot time unit may be in multiples of OFDM symbols. For a (e.g., each) normal slot, the indicator may provide information regarding one or more of the following. For a (e.g., each) normal slot, the indicator may provide information regarding the starting time of the first mini-slot used by the URLLC traffic. The starting time may be in multiples of OFDM symbols. For example, the starting time may be in multiples of OFDM symbols and/or may be measured from the starting time of the current normal slot. For a (e.g., each) normal slot, the indicator may provide information regarding the ending time of the mini-slot in the current normal slot. For a (e.g., each) normal slot, the indicator may provide information regarding the number of mini-slots. For example, the indicator may provide information regarding the number of mini-slots in case multiple mini-slots are scheduled. For a (e.g., each) normal slot, the indicator may provide information regarding the starting frequency and/or the ending frequency within the current normal time slot. The frequencies may be in multiples of a frequency unit. For example, the frequencies may be in multiples of a resource element, a resource block (RB), and/or a group of resource blocks (RBs).

Hybrid signaling with CRC (cyclic redundancy check) may be performed. The indication (e.g., the entirety of the indication) may be explicitly represented by modulating a subset of resources. The selection of the resources may convey information and/or may provide explicit signaling. CRC check bits may be included in the indication. For example, CRC check bits may be included in the indication to let the eMBB WTRU decide whether the eMBB WTRU has received an indication (e.g., a correct indication). The CRC check bits may take additional information into account. For example, by using resource selection for conveying additional information, the CRC check bits may take the additional information into account.

Figure 20:
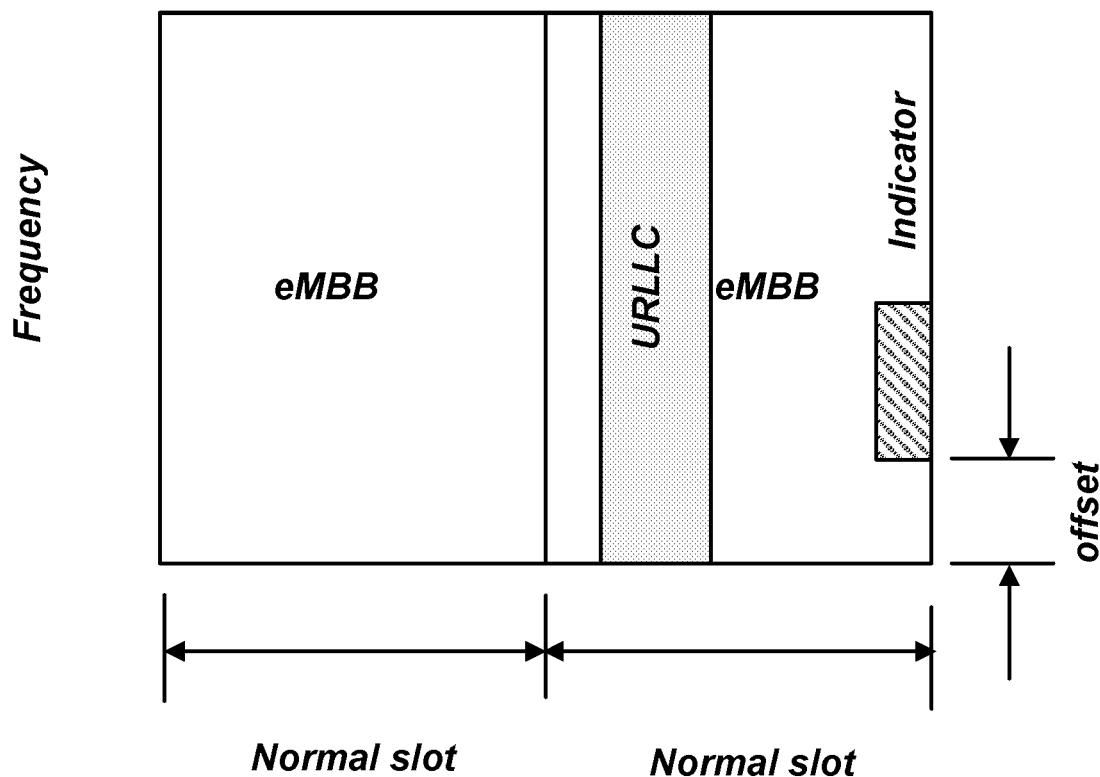
FIG. 20 is an example of using an offset of the indicator to convey information.

FIG. 20 is an example of using an offset of the indicator to convey information. For example, an offset of the indicator in frequency may represent resource selection. The offset may be the difference between a reference frequency (e.g., the lower frequency of the frequency band in question) and a starting frequency of the indicator. The offset may be in multiples of a basic frequency unit. For example, the offset may be in multiples of 15 KHz. The length of the indicator may be fixed.

The offset of the indicator may take $2^M$ values. There may be L message bits and/or K CRC bits. A portion of the L+K bits may be mapped to an offset. The remaining bits may be used to modulate the resources.

Figure 21:
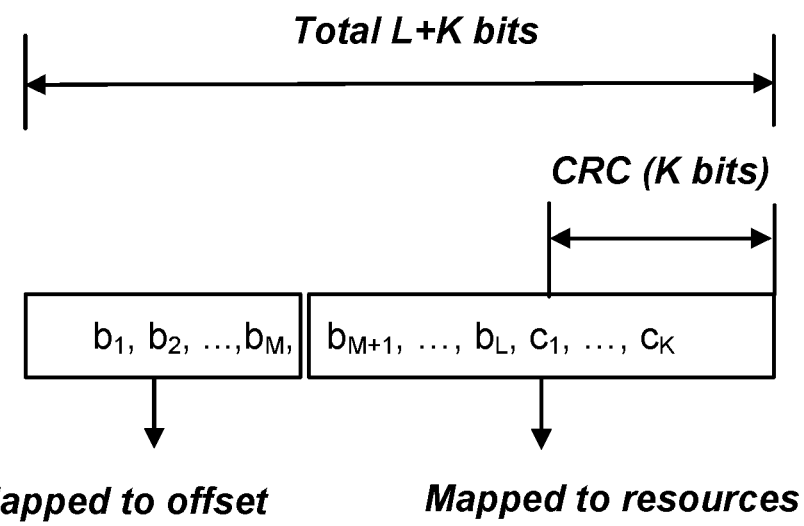
FIG. 21 is an example of mapping of the bits to the resource offset and the resources, e.g., without channel coding.

FIG. 21 is an example of mapping bits to a resource offset and the resources, for example, without channel coding. The first M message bits (e.g., bits $b_1, b_2, \ldots, b_M$) may be mapped to an offsets for the indicator. The remaining bits (e.g., bits $b_{M+1}, \ldots, b_L, c_1, \ldots, c_K$) may be mapped to the resources and/or may determine the signals on the resources. The CRC may be calculated using the bits carried by the modulated signal over the selected resources and/or the bits conveyed by the offset. For example, $(c_1, \ldots, c_K)$=f$(b_1, b_2, \ldots, b_M, b_{M+1}, \ldots, b_L)$, where f( ) may be a function that constructs the CRC bits. If the RNTI has fewer bits than f$(b_1, b_2, \ldots, b_M, b_{M+1}, \ldots, b_L)$, the CRC may be constructed by $(c_1, \ldots, c_K)$=f$(b_1, b_2, \ldots, b_M, b_{M+1}, \ldots, b_L)$ XOR R, where R may be an extended RNTI (radio network temporary identifier), by prefixing zeros to the RNTI.

The eMBB WTRU may attempt the values (e.g., possible values) of the offset s. For example, when receiving and/or processing the DL transmission, the eMBB WTRU may attempt the values (e.g., possible values) of the offset s and/or may use the inverse map to get the corresponding bits $b_1, b_2, \ldots, b_M$. The eMBB WTRU may process the resources. The eMBB WTRU may get bits $b_{M+1}, \ldots, b_L$, $c_1, \ldots, c_K$. The eMBB WTRU may check if $b_1, b_2, \ldots, b_M$ together with $b_{M+1}, \ldots, b_L$ give the correct CRC bits $(c_1, \ldots, c_K)$. For example, the eMBB WTRU may check if $b_1, b_2, \ldots, b_M$ together with $b_{M+1}, \ldots, b_L$ give the correct CRC bits $(c_1, \ldots, c_K)$ in the case where the extended RNTI is not used. The eMBB WTRU may check if $b_1, b_2, \ldots, b_M$ together with $b_{M+1}, \ldots, b_L$ give the extended RNTI. For example, the eMBB WTRU may check if $b_1, b_2, \ldots, b_M$ together with $b_{M+1}, \ldots, b_L$ give the extended RNTI in the case where the extended RNTI is used.

Indicator information may be channel coded. For example, indicator information and CRC may be channel coded. Indicator information and CRC may be channel coded to protect against channel errors. Channel coded bits may represent the offset and/or may be conveyed (e.g., conveyed implicitly). For example, the first M bits of the channel coded bits may represent the offset and/or may be conveyed (e.g., conveyed implicitly). The remaining bits may be transmitted (e.g., explicitly transmitted) by modulating the selected time-frequency resources.

Figure 22:
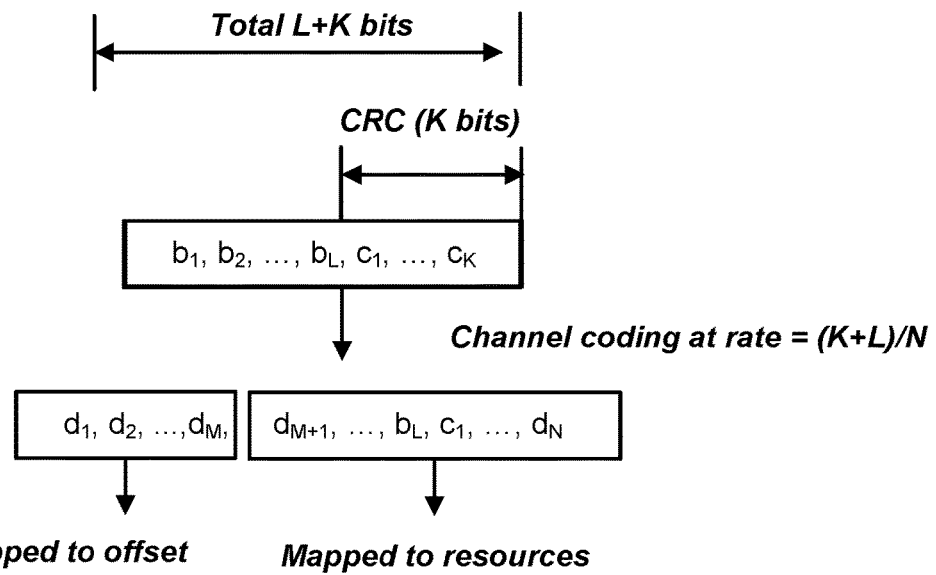
FIG. 22 is an example of mapping of the bits to the resource offset and the resources, e.g., with channel coding.

FIG. 22 is an example mapping of bits to the resource offset and the resources, for example, with channel coding. The information bits $b_1, \ldots, b_L$ and the CRC bits $c_1, \ldots, c_K$ may be encoded with a channel code. The output may be N bits: $d_1, \ldots, d_N$. Of the N bits, the first M bits $d_1, d_2, \ldots, d_M$ may be mapped to the offset of the indicator. The remaining N-M bits may be mapped to the allocated time-frequency resources. If the channel code has parity check capability, the CRC bits may be eliminated (e.g., to save resources). For example, if the channel code has parity check capability, such as the LDPC code, the CRC bits may be eliminated, e.g., to save resources.

An indicator may be sent in the downlink. For example, an indicator may be sent in the downlink to ensure that the eMBB and/or the URLLC receivers are aware that the eMBB data may be pre-empted (e.g., by puncturing and/or by superposition). The indicator may add overhead to the system and/or may result in poor performance. For example, the indicator may add overhead to the system and/or may result in poor performance if decoded incorrectly. A semi-persistent URLLC indication may be provided. In scenarios where there may be continuous URLLC data insertion and/or in scenarios where a URLLC transmission (e.g., a specific URLLC transmission) may be transmitted over one or more time resources (e.g., slots/mini-slots), a semi-persistent URLLC indicator may be used to indicate that URLLC data may be inserted in a predefined number of resources over a predefined amount of time. A semi-persistent URLLC indication may take effect for n time slots. n may be configurable. The indicator may reduce the overhead and/or possibility of false positives. The indicator may reduce the processing (e.g., overall processing) needed by the eMBB receiver. The receiver may determine to accommodate the URLLC traffic. For example, the receiver may determine to accommodate the URLLC traffic a-priori.

One or more search spaces for DCI blind decoding may be provided. For example, one or more search spaces for DCI blind decoding for URLLC and eMBB multiplexing may be provided. Details of the preemptive multiplexing of URLLC with eMBB may be sent to the eMBB WTRU. For example, details of the preemptive multiplexing of URLLC with eMBB may be sent to the eMBB WTRU to optimize the performance of the eMBB WTRU. The eMBB WTRU may perform per slot DCI monitoring. If the eMBB WTRU performs per slot DCI monitoring, the preemptive multiplexing information may be sent in the DCI of the next time slot.

Figure 23:
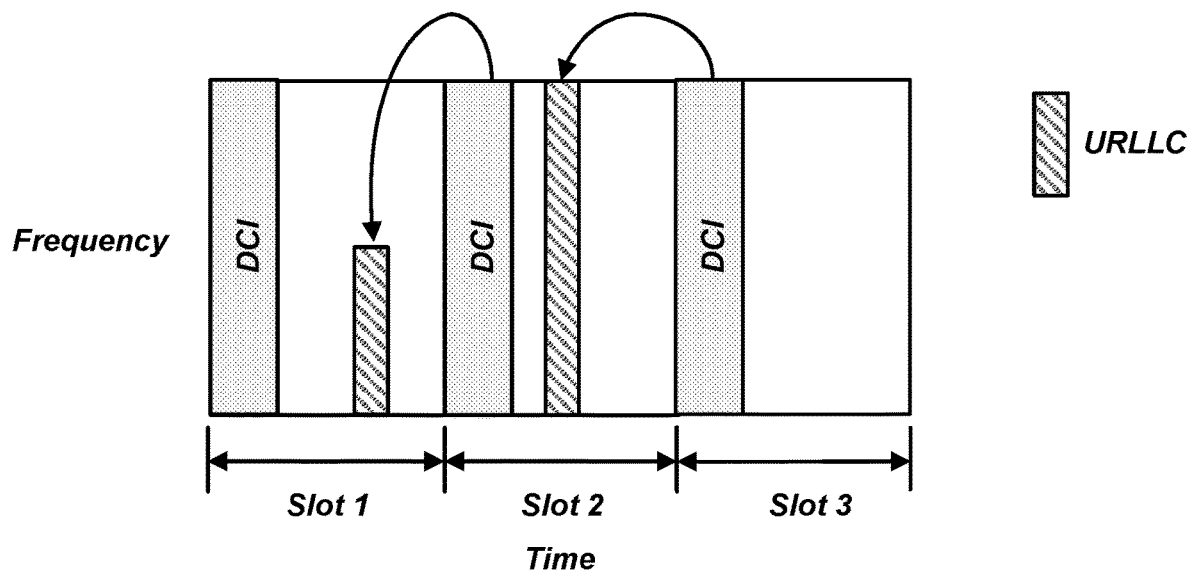
FIG. 23 is an example of preemptive multiplexing information provided in the Downlink Control Information (DCI) of the next time slot.

FIG. 23 is an example of preemptive multiplexing information provided in the DCI of the next time slot. DCI formats (e.g., possible DCI formats) with preemptive multiplexing may be different from DCI formats without preemptive multiplexing. For example, a DCI format may be provided when there is preemptive multiplexing and another DCI format may be provided when there is not preemptive multiplexing. The WTRU may search (e.g., may always search) for a pre-defined exclusive DCI Format. For example, the WTRU may search (e.g., may always search) for a pre-defined exclusive DCI Format that may carry information regarding the overlapping eMBB/URLLC resources in the previous slot/mini-slot/subframe. One or more of the following may apply, as described herein. The predefined DCI format for the overlapping eMBB/URLLC resources may carry a smaller payload size. The pre-defined DCI format for eMBB/URLLC multiplexing may carry a larger payload size. The WTRU may identify whether the DCI belongs to the previous slot and/or the current slot. The WTRU may use one or more (e.g., different) CRC masks.

The predefined DCI format for the overlapping eMBB/URLLC resources may carry a payload size. For example, the predefined DCI format for the overlapping eMBB/URLLC resources may carry a smaller (e.g., much smaller) payload size than the DCI formats that carry the information regarding the ongoing eMBB traffic in the current slot. The short pre-defined DCI format may carry (e.g., may only carry) information regarding frequency and/or time resources (e.g., PRBs, OFDM symbols, mini-slot index, etc.). For example, the short pre-defined DCI format may carry (e.g., may only carry) information regarding frequency and/or time resources (e.g., PRBs, OFDM symbols, mini-slot index, etc.) allocated for the overlapping URLLC/eMBB transmissions in the previous slot. The short DCI format for eMBB/URLLC multiplexing may be used for puncturing. For example, the short DCI format for eMBB/URLLC multiplexing may be used for puncturing where the eMBB resources are partially punctured and/or replaced by the URLLC transmissions.

The pre-defined DCI format for eMBB/URLLC multiplexing may carry a larger payload size. For example, the pre-defined DCI format for eMBB/URLLC multiplexing may carry a larger payload size that may include information and/or frequency-time allocations such as a modulation and coding scheme, transmission mode, MIMO precoding, power allocation, etc. The long DCI format may be used for a superposition scheme. The long DCI format may be used by the WTRU. For example, the long DCI format may be used by the WTRU that determines to detect and/or cancel the interference from the co-scheduled WTRU on the overlapping eMBB/URLLC resources. The WTRU may derive the information regarding the modulation, coding, power, and/or MIMO precoding etc., of the interfering WTRU. The WTRU may reconstruct the transmitted signal for the co-scheduled WTRU. The WTRU may cancel the transmitted signal from the received signal. For example, the WTRU may cancel the transmitted signal from the received signal to extract the desired signal.

The WTRU may identify whether the DCI belongs to the previous slot or the current slot. For example, the WTRU may identify whether the DCI belongs to the previous slot or the current slot by detecting a bit (e.g., one bit) flag. The bit flag may be included in the payload of the DCI. The DCI format may be the same or identical (e.g., substantially the same or identical) for eMBB/URLLC multiplexing and eMBB traffic. If the flag bit is one, the WTRU may determine that the DCI message may comprise information. For example, the WTRU may determine that the DCI message may comprise information regarding the overlapping eMBB/URLLC resources from the previous slot. If the flag bit is zero, the WTRU may determine that the DCI message may comprise information. The WTRU may determine that the DCI message may comprise information regarding the assignments/grants in the current slot intended for the WTRU.

The WTRU may use one or more (e.g., different) CRC masks (e.g., RNTIs). For example, the WTRU may use one or more (e.g., different) CRC masks (e.g., RNTIs) to identify (e.g., implicitly identify) whether DCI belongs to a slot. The WTRU may use one or more (e.g., different) CRC masks (e.g., RNTIs) to identify (e.g., implicitly identify) whether DCI belongs to a previous slot or a current slot (e.g., eMBB/URLLC multiplexing in the previous slot or eMBB traffic in the current slot). The WTRU may be assigned two RNTIs. For example, the WTRU may be assigned RNTI1 and RNTI2. The WTRU may check the CRC using RNTIs (e.g., assigned RNTIs). If the check on the CRC is successful (e.g., the CRC bits carried in the transmission agree with the CRC bits computed from the data) using the RNTI1, the WTRU may determine that the DCI message may comprise information regarding the overlapping eMBB/URLLC resources from a slot (e.g., the previous slot). For example, if the WTRU determines that CRC bits carried in the transmission agree with the CRC bits computed from the data using the RNTI1, the WTRU may determine that the DCI message comprises information regarding the overlapping eMBB/URLLC resources from the previous slot. If the check on the CRC is successful using the RNTI2, the WTRU may conclude that the DCI message comprises information regarding the assignments/grants in the current slot intended for the WTRU.

The possible DCI formats with preemptive multiplexing may be different from the DCI formats without preemptive multiplexing. It may be an inefficient use of time and/or power if the eMBB WTRU searches through DCI formats (e.g., all DCI formats).

Two search spaces may be provided. For example, a search space (e.g., S1) may be provided for the case of not having the preemptive multiplexing. A search space (e.g., S2) may be provided for the case of having preemptive multiplexing.

Figure 24:
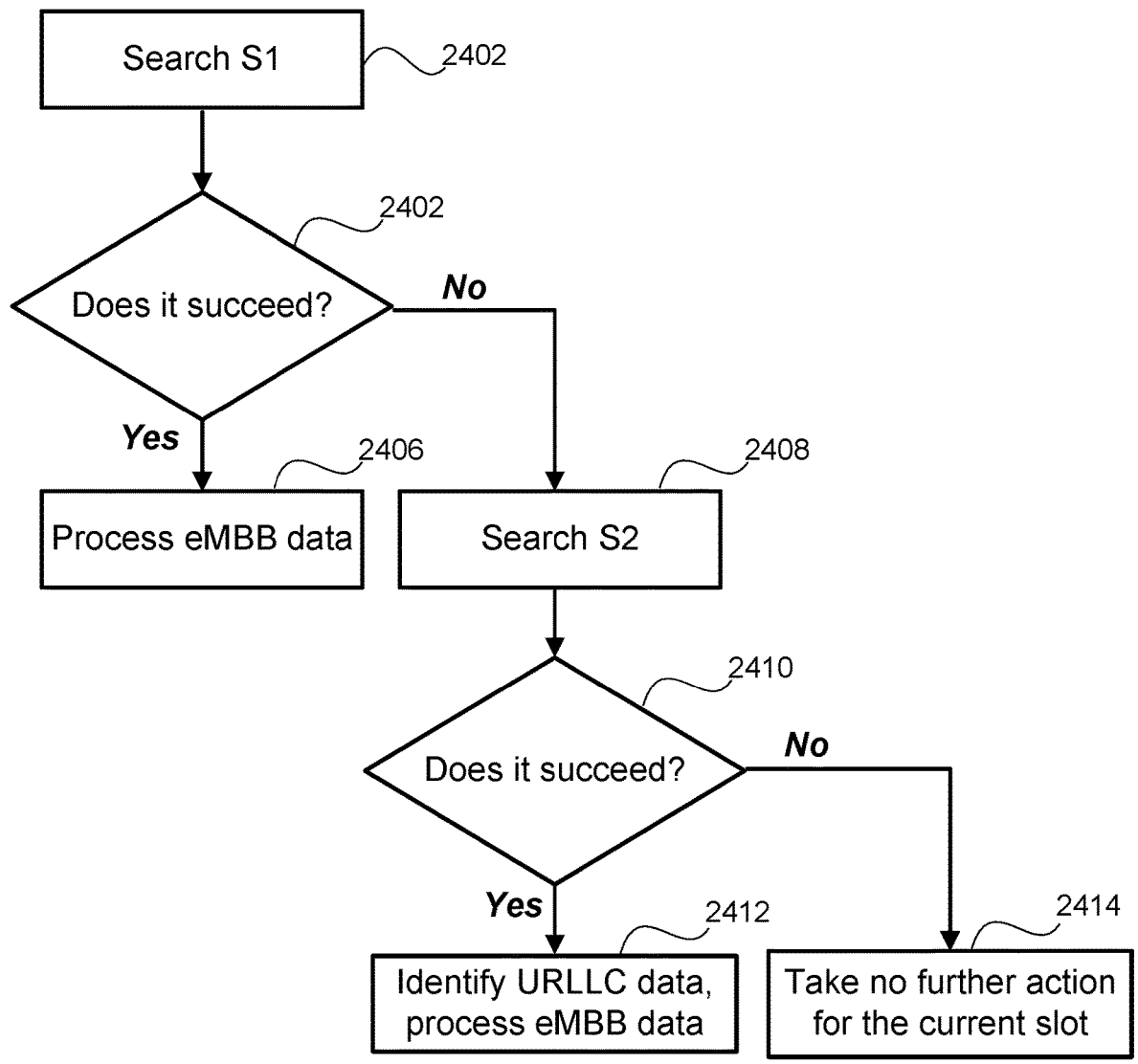
FIG. 24 is an example of enhanced mobile broadband (eMBB) using multiple search spaces for DCI.

FIG. 24 is an example of an eMBB WTRU using multiple search spaces (e.g., S1, S2) for DCI. The search spaces S1 and S2 may overlap on the physical resources or PDCCH candidates for a WTRU. The eMBB WTRU may attempt to search S1, at 2402. It may be determined whether the search of S1 is successful, at 2404. If the search of S1 is successful, process the eMBB data, at 2406. If the eMBB WTRU fails in searching S1, the eMBB WTRU may attempt to search S2, at 2408. It may be determined, at 2410, whether the search of S2 is successful. If the search of S2 is successful, identify URLLC data and/or process the eMBB WTRU data, at 2412. If the search of S2 is unsuccessful, no further action may be taken. For example, no further action for the current slot may be taken.

A search space of a normal slot may overlap with a search space of a mini-slot. For example, in the presence of mini-slots, the search space of the normal slot may overlap with the search space of the mini-slot. The search space of the normal slot may overlap with the search space of the mini-slot to lower the computational complexity associated with blind decoding. The WTRU may be configured to perform blind decoding on the search space of the slot and/or mini-slot.

Figure 25:
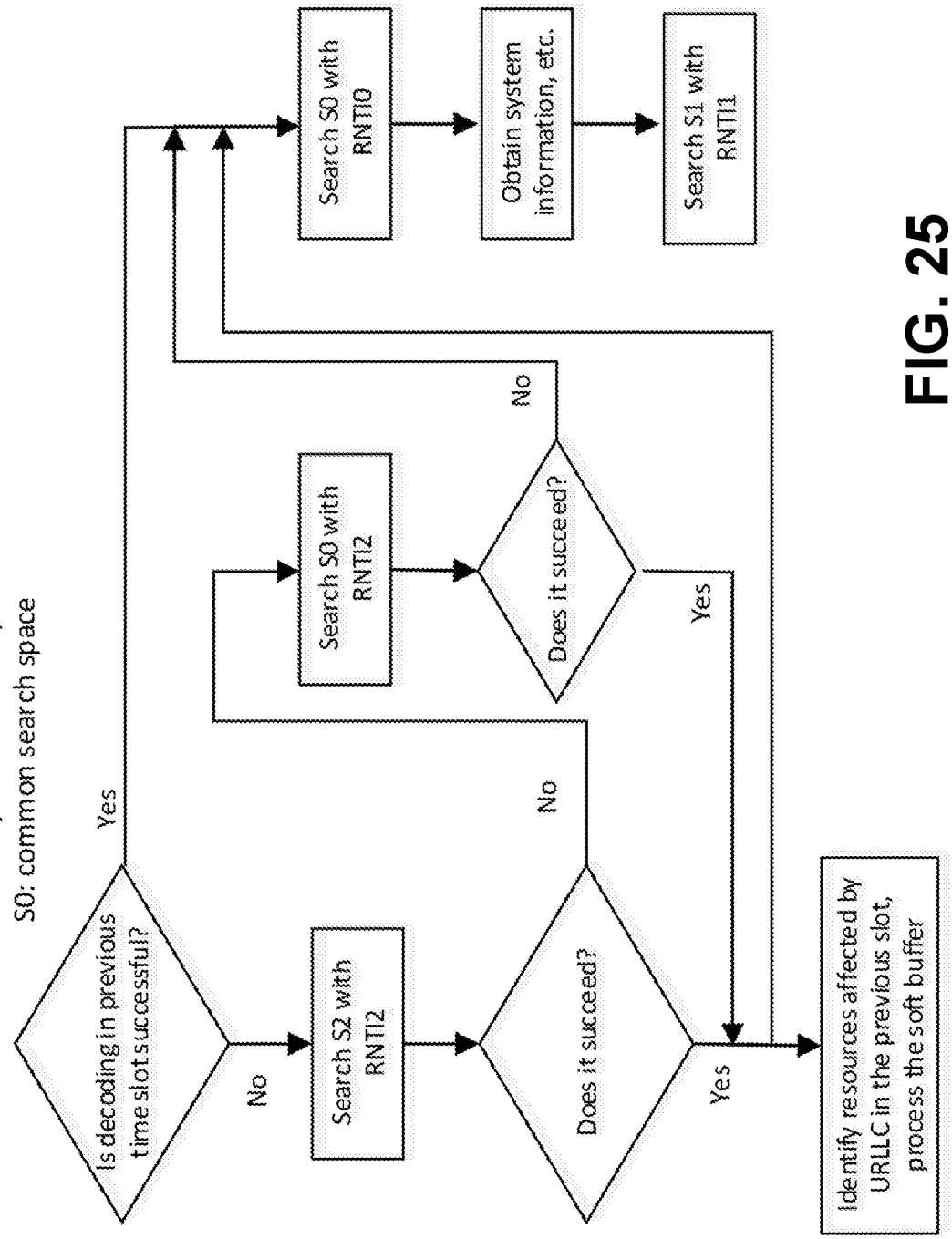
FIG. 25 illustrates an example where an eMBB WTRU may search three search spaces.

FIG. 25 illustrates an example where an eMBB WTRU may search one or more of three search spaces. The three search spaces may be denoted as follows. S2, which may be a search space for URLLC and eMBB preemptive multiplexing. S1, which may be a WTRU specific search space. S0, which may be a common search space.

Example behavior of an eMBB WTRU may be shown in FIG. 25. The eMBB WTRU may attempt to decode (e.g., detect) data (e.g., data of a PDSCH). For example, the eMBB WTRU may attempt to decode (e.g., detect) a PDSCH in a previous slot. If the eMBB fails to decode (e.g., fails to detect) the PDSCH in the previous slot, the eMBB may search a search space for URLLC and eMBB preemptive multiplexing (e.g., S2). For example, in the current slot (e.g., the current time slot), the eMBB WTRU may search (e.g., may start searching) new radio PDCCH (NR-PDCCH) candidates from a search space (e.g., S2). The PDCCH (NR-PDCCH) may include a DCI. The eMBB WTRU may search the search space (e.g., S2) with an RNTI2. The search space (e.g., S2) may include the NR-PDCCH for the preemptive multiplexing of URLLC/eMBB in the previous slot (e.g., previous time slot).

If the eMBB WTRU detects (e.g., decodes) the PDSCH in the previous slot, the WTRU may not search the search space (e.g., S2) in the current slot which carries the NR-PDCCH candidates for the preemptive multiplexing of URLLC/eMBB in the previous slot. If the WTRU decodes (e.g., successfully decodes) a PDCCH for the previous slot, the WTRU may blind code (e.g., continue to blind decode) one or more (e.g., other) PDCCH candidates. The WTRU may blind code (e.g., continue to blind decode) one or more (e.g., other) PDCCH candidates for the current slot in the same control region. For example, the WTRU may blind code (e.g., continue to blind decode) one or more (e.g., other) PDCCH candidates for the current slot in the common search space (e.g., S0) and/or the WTRU specific search space (e.g., S1). The WTRU may continue blind decoding of one or more (e.g., other) PDCCH candidates for the current slot in the common search space (e.g., S0) and/or the WTRU specific search space (e.g., S1) to determine whether there are assignments for the WTRU in the current slot.

If the eMBB WTRU fails to detect (e.g., fails to decode) the PDSCH in the previous slot, the eMBB WTRU may determine whether the search of S2 with the RNTI2 is successful. If the search of S2 with the RNTI2 is successful, the WTRU may identify resources that were affected by the URLLC preemptive multiplexing in the previous time slot. The WTRU may process the soft buffer that comprises the soft bits for the previous time slot. For example, if the preemptive multiplexing scheme is puncturing, the WTRU may ignore the affected soft bits. If the preemptive multiplexing scheme is superposition, the WTRU may perform superposition decoding.

The search spaces may be overlapping. For example, the search spaces may be overlapping if the eMBB WTRU is unsuccessful in the search of search space S2 with RNTI2. One or more of the common search spaces (e.g., S0) may carry preemptive URLLC/eMBB multiplexing information. For example, one or more of the common search spaces (e.g., S0) may carry preemptive URLLC/eMBB multiplexing because a (e.g., each) WTRU (e.g., the eMBB WTRU) may search (e.g., may always search) the common search space (e.g., S0). The eMBB WTRU may attempt (e.g., may first attempt) to use the RNTI intended for obtaining the preemptive URLLC/eMBB multiplexing information in the common search space (e.g., S0). For example, the eMBB may attempt to search a common search space (e.g., S0) with RNTI2, as shown in FIG. 25. If the eMBB WTRU succeeds in the search of S0 with RNTI2, the eMBB WTRU may process the soft buffer for the previous time slot. For example, if the eMBB WTRU succeeds in the search of S0 with RNTI2, the eMBB WTRU may identify resources affected by URLLC (e.g., resources affected by URLLC in the previous slot) and/or process the soft buffer.

If the eMBB WTRU does not succeed in the search of the common search space (e.g., S0) with RNTI2, the eMBB WTRU may search (e.g., continue to search) the common search space (e.g., S0). For example, if the eMBB WTRU does not succeed in the search of S0 with RNTI2, the eMBB WTRU may search (e.g., continue to search) the common search space (e.g., S0) with an RNTI0. The eMBB WTRU may continue to search the common search space (e.g., search S0 with RNTI0), regardless of the search result. As shown in FIG. 25, the eMBB WTRU may obtain system information, etc. The eMBB WTRU may search the WTRU specific search space (e.g., S1). For example, the eMBB WTRU may search the WTRU specific search space (e.g., S1) with RNTI1.

A WTRU may search (e.g., may only search) a predefined search space that may be configured to carry an NR-PDCCH for a preemptive multiplexing of URLLC/eMBB. For example, to lower the number of blind decodings, the WTRU may search (e.g., may only search) the pre-defined search space that is configured to carry the NR-PDCCH for the preemptive multiplexing of URLLC/eMBB in the previous slot on the slots/mini-slots/subframes which may be configured by the higher layer signaling for eMBB/URLLC multiplexing. The gNB may limit the eMBB/URLLC multiplexing. For example, the gNB may limit the eMBB/URLLC multiplexing to predefined slots/mini-slots/subframes. The gNB may limit the eMBB/URLLC multiplexing to predefined slots/mini-slots/subframes through semi-static configuration.

The search space may be a common search space. For example, the search space that carries the NR-PDCCH candidates for the preemptive multiplexing of URLLC and eMBB in the previous slot may be a common search space. The search space that carries the NR-PDCCH candidates for the preemptive multiplexing of URLLC and eMBB in the previous slot may be a common search space that a (e.g., each, all) WTRU may need to monitor the NR-PDCCH candidates (e.g., all the NR-PDCCH candidates) within the search space. The WTRU may monitor fixed NR-PDCCH candidates. For example, the WTRU may monitor fixed NR-PDCCH candidates within the DL control region in slots/mini-slots/subframes (e.g., all slots/mini-slots/subframes) that may be dedicated for eMBB/URLLC multiplexing. The NR-PDCCH candidates may not be used for transmitting DCI formats for the current slot.

The search space that carries the NR-PDCCH candidates for the preemptive multiplexing of URLLC and/or eMBB in the previous slot may be a group-common search space. For example, the search space that carries the NR-PDCCH candidates for the preemptive multiplexing of URLLC and/or eMBB in the previous slot may be a group-common search space in which a group of WTRUs (e.g., only the group of WTRUs) may monitor (e.g., may need to monitor) in a (e.g., each) slot/mini-slot/subframe (e.g., configured slot/mini-slot/subframe). The group of WTRUs is a subset of WTRUs. For example, for a group common search space, the group of WTRUs that may monitor (e.g., may need to monitor) the search space may be WTRUs which may have PDSCH assignments that may overlap with the resources for URLLC transmission in the previous slot. The WTRU may receive a group ID from the gNB. The group ID may be used by the WTRU. For example, the group ID may be used by the WTRU to determine the NR-PDCCH candidates for the overlapping resources in the previous slot.

A search space may carry NR-PDCCH candidates. For example, the search space that carries NR-PDCCH candidates for the preemptive multiplexing of URLLC and/or eMBB in the previous slot may be dimensioned. The search space that carries the NR-PDCCH candidates for the preemptive multiplexing of URLLC and/or eMBB in the previous slot may be dimensioned such that blocking may be minimized. There may be enough NR-PDCCH candidates in the search space. For example, there may be enough NR-PDCCH candidates in the search space such that the WTRU may find (e.g., may always find) the NR-PDCCH corresponding to the overlapping URLLC/eMBB resources in the previous slot. The WTRU may find (e.g., may always find) the NR-PDCCH corresponding to the overlapping URLLC/eMBB resources in the previous slot whether or not the WTRU has managed to detect and decode (e.g., successfully detect and decode) the PDSCH in the previous slot. The gNB may dimension the size of the search space. For example, the gNB may dimension the size of the search space according to the URLLC traffic. The URLLC traffic may include the number of URLLC users needed to be served in a (e.g., each) slot. The search space that carries the NR-PDCCH candidates for the preemptive multiplexing of URLLC and/or eMBB in the previous slot may overlap with the common search space and/or the WTRU-specific search space of the WTRU for the current slot. Overlapping may increase the pool of PDCCH candidates for the WTRU and/or lower the blocking probability. The overlap(s) among the search spaces may change in a slot. For example, the overlap(s) among the search spaces may change in a slot according to a certain pre-defined pattern. The overlap(s) among the search spaces may change in a slot according to a certain pre-defined pattern to lower the blocking probability. The WTRU may follow features (e.g., the same features) for monitoring NR-PDCCH candidates for WTRU-specific search space and/or common search space. For example, the WTRU may follow the same features for monitoring NR-PDCCH candidates for WTRU-specific search space and/or common search space when there is an overlap with the search space for URLLC/eMBB multiplexing.

UL resource reservation may be based on a URLLC UL load rate. Resources may be reserved for URLLC UL pre-emptive transmission based on the URLLC load rate. As the URLLC load rate increases, the amount of resources reserved for URLLC UL transmission may be increased.

The gNB may estimate the URLLC resources to be reserved. The amount of URLLC UL resources (e.g., URLLC UL resources needed) may be estimated semi-statically. The amount of URLLC UL resources (e.g., URLLC UL resources needed) may be estimated semi-statically based on URLLC WTRU initial access. For example, the WTRU may signal (e.g., explicitly signal) the delay and/or reliability (e.g., the desired delay and/or reliability). The WTRU may signal (e.g., explicitly signal) the delay and/or reliability (e.g., the desired delay and/or reliability) on initial access. The WTRU may signal a predetermined URLLC traffic class. For example, the WTRU may signal a pre-determined URLLC traffic class that indicates (e.g., implicitly indicates) the delay and/or reliability required on initial access.

Figure 26:
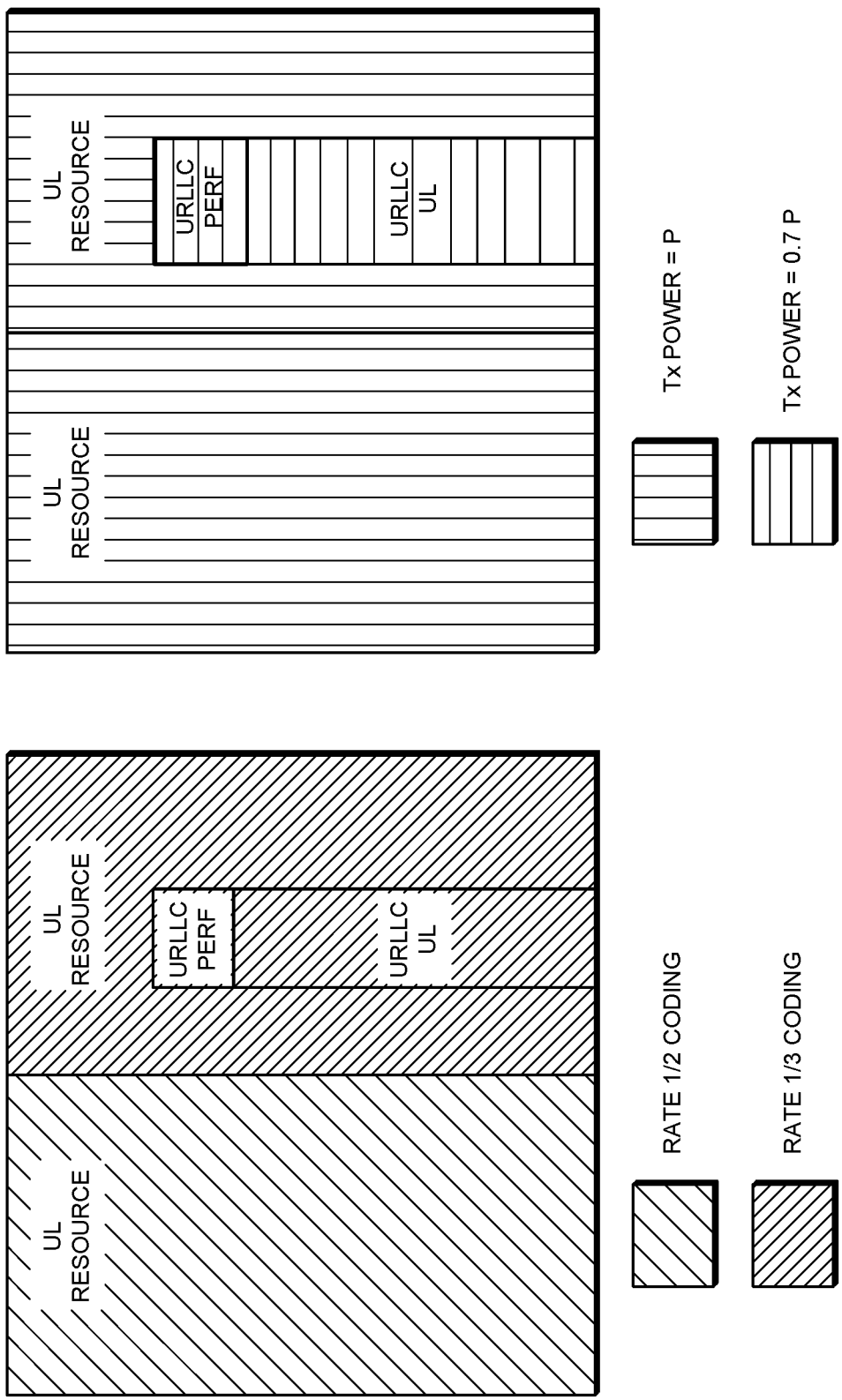
FIG. 26 is an example of coding and transmit power for eMBB transmission with URLLC uplink (UL) preemption.

The eNB may signal the amount and/or location of the resources statically, semi-statically, and/or dynamically. For example, the eNB may signal the amount and/or location of the resources statically, semi-statically, and/or dynamically as instantaneous or semi-persistent signaling. The information may be signaled in the DCI. For example, the information may be signaled in the DCI using the PDCCH. A dedicated URLLC/gNB resource indication channel may signal the information.

eMBB UL transmission and/or URLLC UL transmission may occur. URLLC WTRUs may be scheduled with the resources (e.g., time and frequency) reserved for the URLLC WTRU. URLLC WTRUs may access the resources allocated to the eMBB WTRU, e.g., in a grantless manner. eMBB WTRUs may avoid the resources reserved for the URLLC WTRU. eMBB WTRUs may transmit within the resources reserved for the URLLC WTRU, e.g., in a manner that may accommodate pre-emption by URLLC WTRUs. FIG. 26 is an example of coding and transmit power for eMBB transmission with URLLC UL preemption. Transmitting in a manner that accommodates pre-emption by URLLC WTRUs may include one or more of the following. For example, transmitting in a manner that accommodates pre-emption by URLLC WTRUs may include transmitting with a robust (e.g., more robust) coding rate in predefined URLL resources (e.g., to protect eMBB transmission). Transmitting in a manner that accommodates pre-emption by URLLC WTRUs may include transmitting with a robust (e.g., more robust) coding rate in a symbol/frame (e.g., the entire symbol/frame) that contains the resources (e.g., to protect eMBB resources). Transmitting in a manner that accommodates pre-emption by URLLC WTRUs may include transmitting at a lower power than the non-URLLC resources (e.g., to protect the possible URLLC transmission). Transmitting in a manner that accommodates pre-emption by URLLC WTRUs may include avoiding transmitting in the URLLC resources (e.g., to protect the possible URLLC transmission).

The gNB may estimate the URLLC resources to be reserved. For example, the gNB may estimate the URLLC resources to be reserved based on URLLC WTRU performance signaling. The URLLC WTRUs may inform the gNB on the performance of the URLLC WTRUs compared with the requirements of the URLLC WTRUs. For example, the signaling may not be required to be ultra-reliable and/or low latency. The amount of URLLC UL resources (e.g., URLLC UL resources needed) may be estimated dynamically on traffic/service requests from URLLC WTRUs (e.g., in the scheduled case). The amount of URLLC UL resources needed may be estimated on signaling (e.g., explicit signaling) between the URLLC WTRU and gNB on the success rate and/or delay of URLLC WTRU transmission (e.g., in the scheduled and/or grantless case). The WTRU may send information on the URLLC reliability and/or the delay experienced. For example, the WTRU may send information on the URLLC reliability and/or the delay experienced compared with the URLLC reliability and/or the delay requested. The comparison may be the difference (e.g., actual difference) and/or may be based on a predetermined set of parameters that may indicate the class of service experienced. For example, a set (e.g., a finite set) of URLLC reliability and delay classes may be defined. The URLLC WTRU may indicate the URLLC WTRU's desired URLLC reliability and/or delay class on initial access. The URLLC WTRU may indicate the URLLC WTRU's experienced URLLC reliability and/or delay class experienced with a transmission (e.g., an explicit transmission) to the gNB (e.g., during a service request). The URLLC WTRU may indicate the number of NAKs and/or an ACK/NAK ratio to the gNB. For example, the URLLC WTRU may indicate the number of NAKs and/or an ACK/NAK ratio to the gNB to signal the reliability of the URLLC WTRU.

Figure 27:
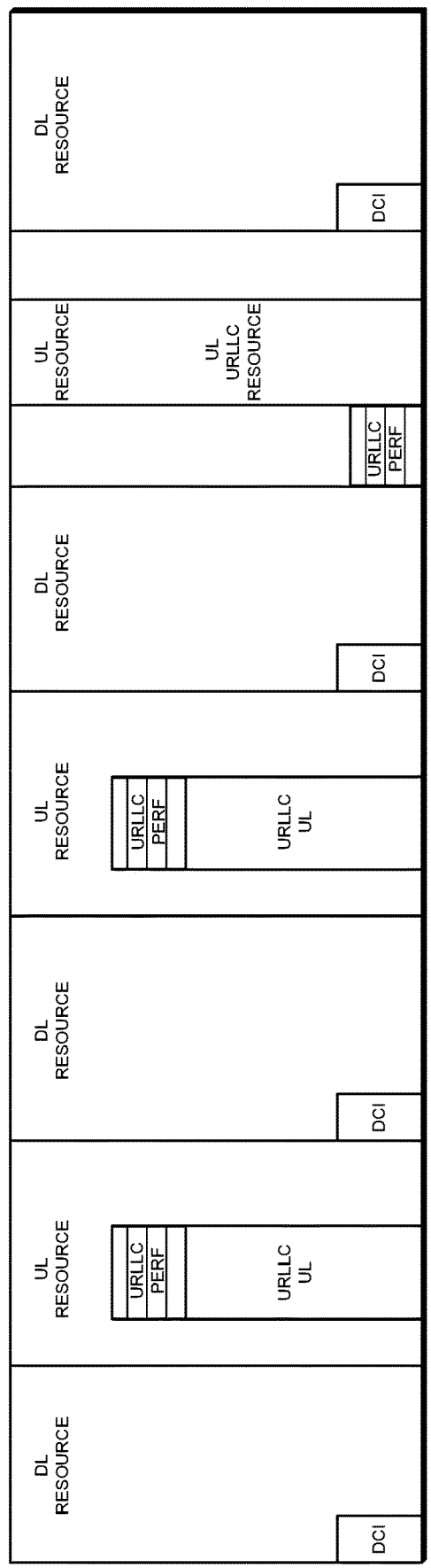
FIG. 27 is an example of a URLLC UL transmission with resource reservation and URLLC performance signaling.

FIG. 27 is an example of a URLLC UL transmission with resource reservation and URLLC performance signaling.

Figure 28:
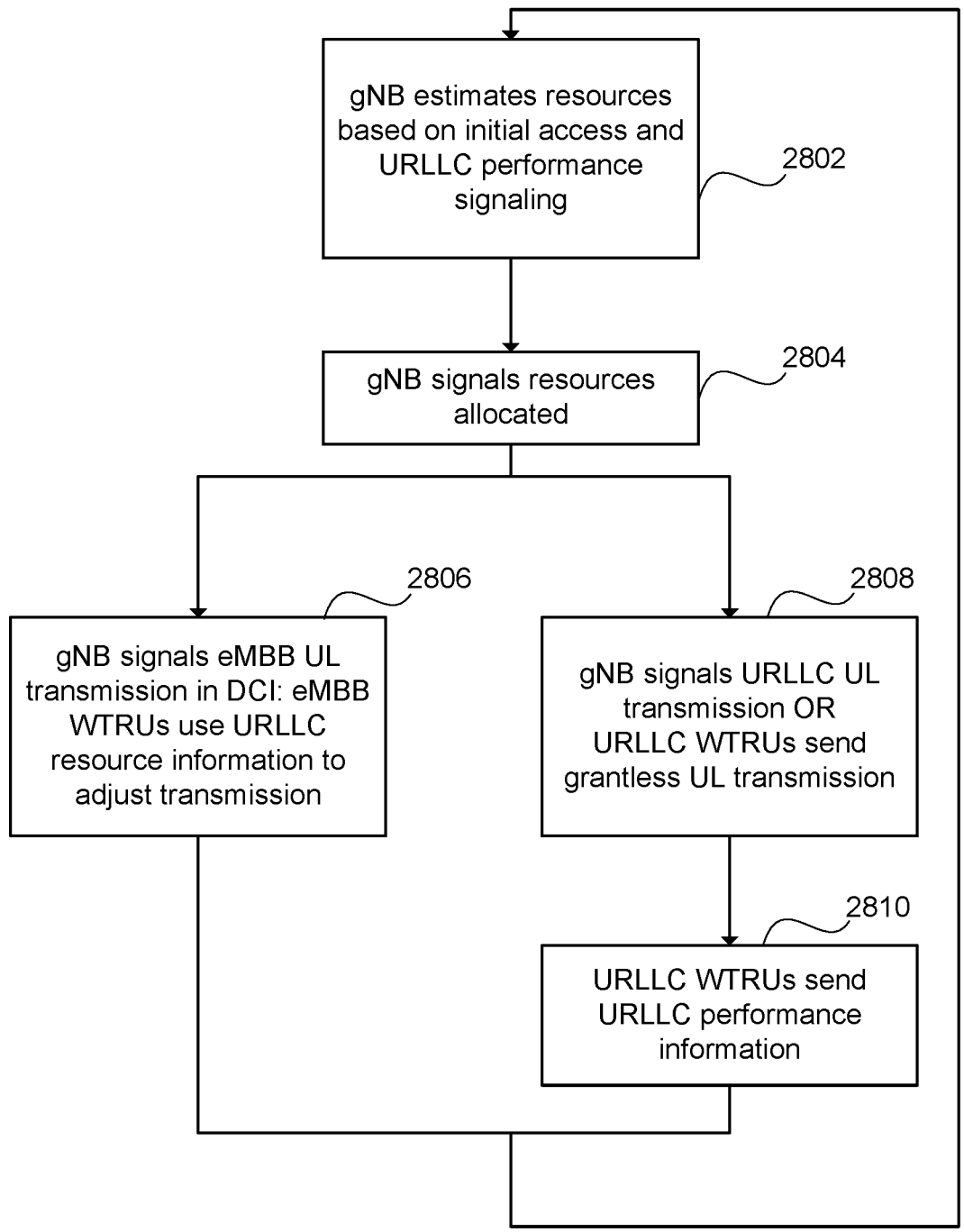
FIG. 28 is an example of UL resource reservation based on URLLC UL load rate and URLLC performance signaling.

FIG. 28 is an example of UL resource reservation based on URLLC UL load rate and URLLC performance signaling. A gNB may estimate resources, at 2802. For example, the gNB may estimate resources based on an initial access and/or a URLLC performance signaling. The gNB may signal sources, at 2804. For example, the gNB may signal allocated resources. At 2806, the gNB may signal an eMBB uplink (UL) transmission. For example, the gNB may signal an eMBB UL transmission in a DCI. One or more eMBB WTRUs may use URLLC resource information. For example, one or more eMBB WTRUs may use URLLC resources to adjust a transmission. At 2808, a gNB may signal a URLLC UL transmission and/or one or more URLLC WTRUs may have sent a grantless UL transmission. At 2810, one or more URLLC WTRUs may send information. For example, one or more URLLC WTRUs may send URLLC performance information.

Device(s) including one or more of the functionalities and/or components described herein may be provided in FIGS. 29A-29D.

Figure 29A:
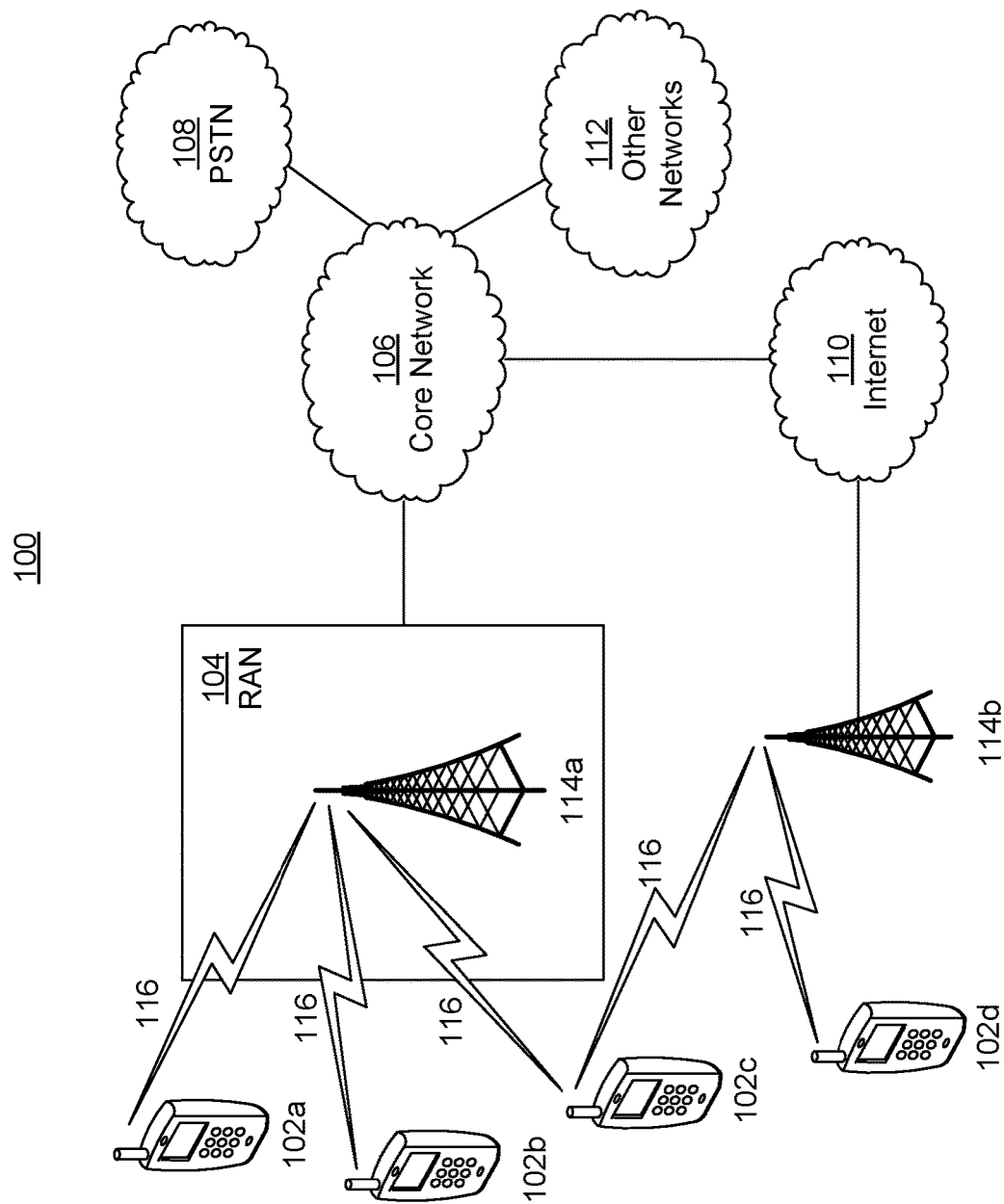
FIG. 29A is a system diagram illustrating an example communications system in which one or more disclosed embodiments may be implemented.

FIG. 29A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 29A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 29A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 29A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 29A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 29A may be configured to communicate with the base station 114a, which may employ a cellular-based radio technology, and with the base station 114b, which may employ an IEEE 802 radio technology.

Figure 29B:
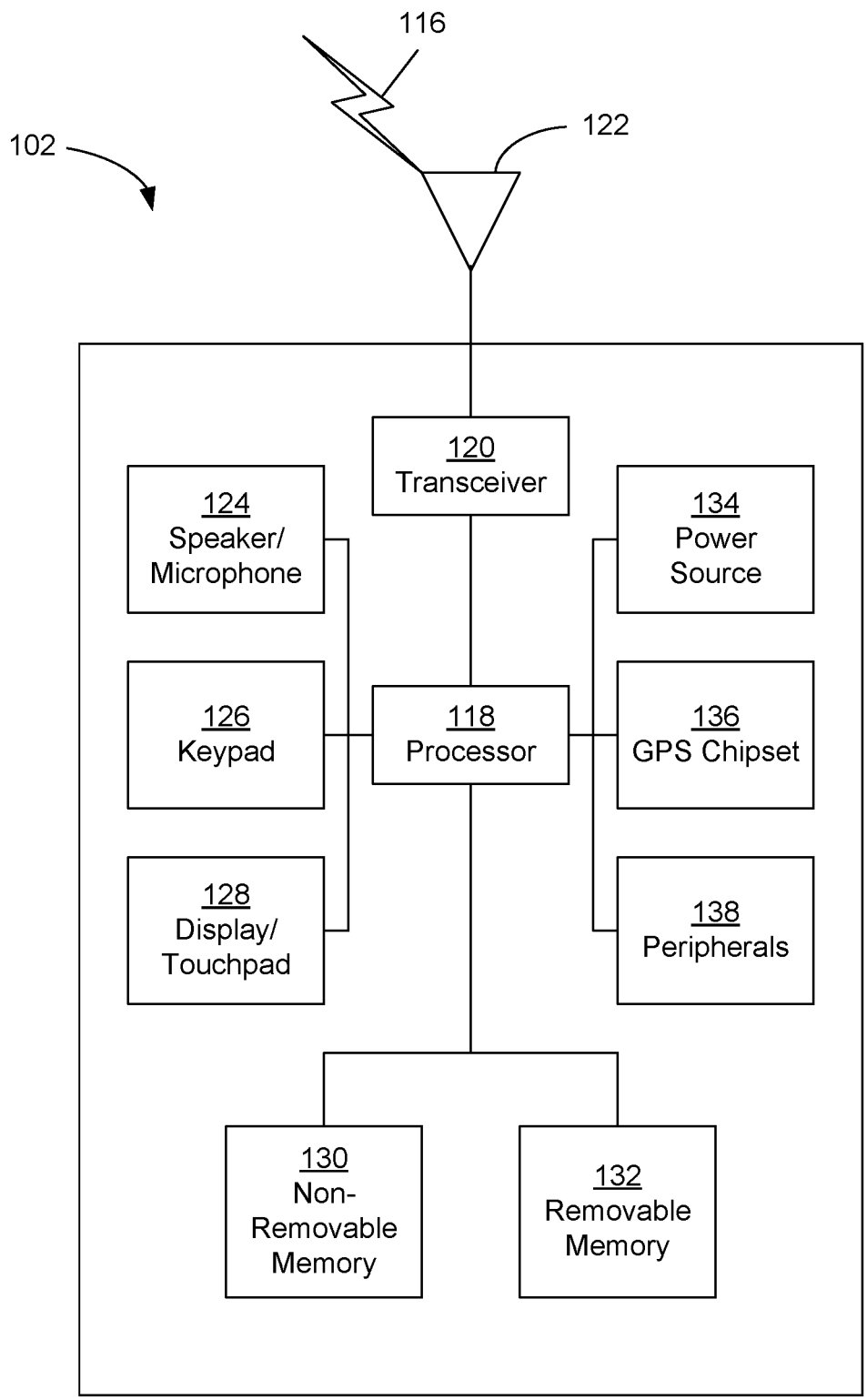
FIG. 29B is a system diagram illustrating an example wireless transmit/receive unit (WTRU) that may be used within the communications system illustrated in FIG. 29A according to an embodiment.

FIG. 29B is a system diagram illustrating an example WTRU 102. As shown in FIG. 29B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 29B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 29C:
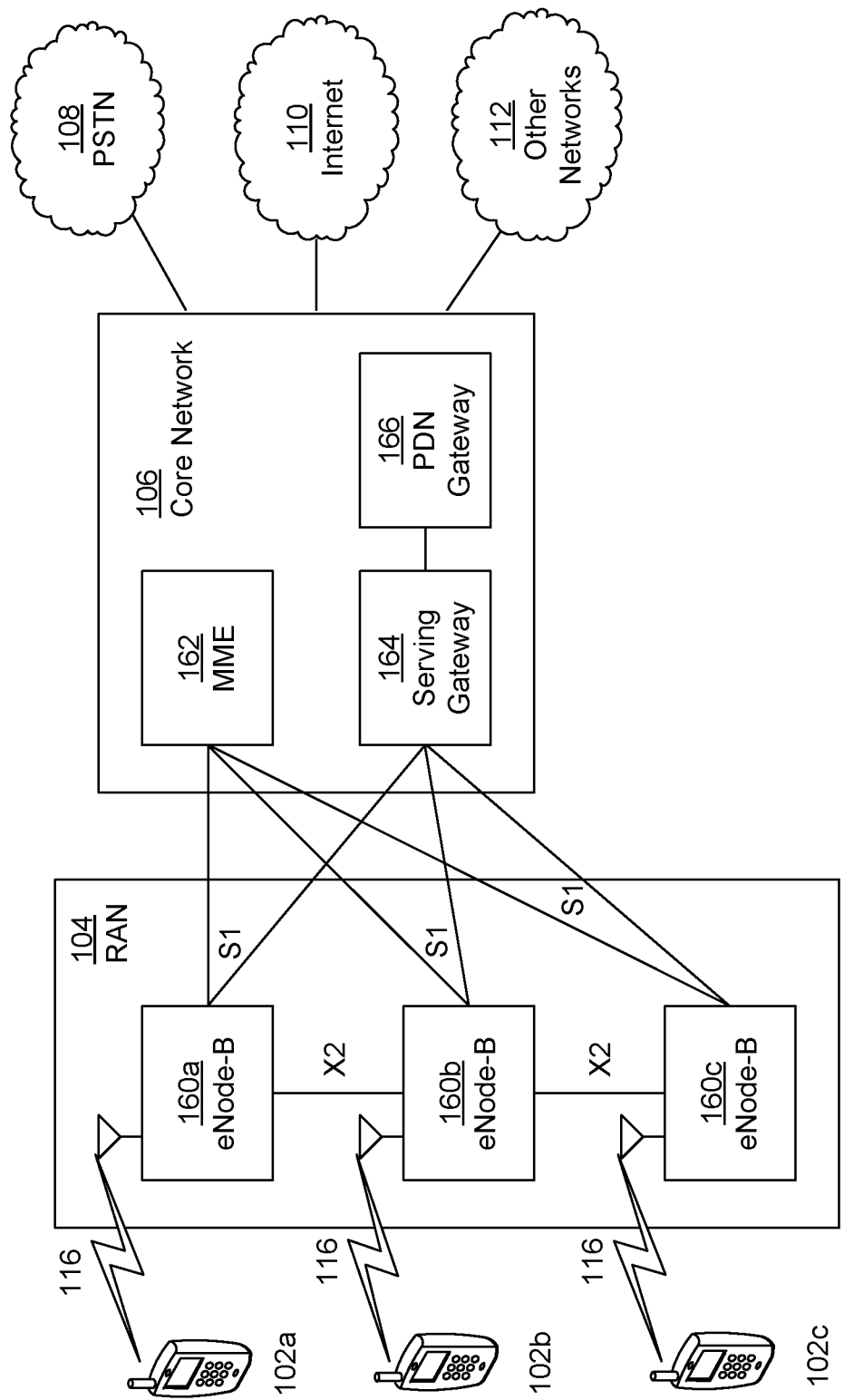
FIG. 29C is a system diagram illustrating an example radio access network (RAN) and an example core network (CN) that may be used within the communications system illustrated in FIG. 29A according to an embodiment.

FIG. 29C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 29C, the eNode-Bs 160a, 160b, 160c may communicate with one another over an X2 interface.

The CN 106 shown in FIG. 29C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 29D:
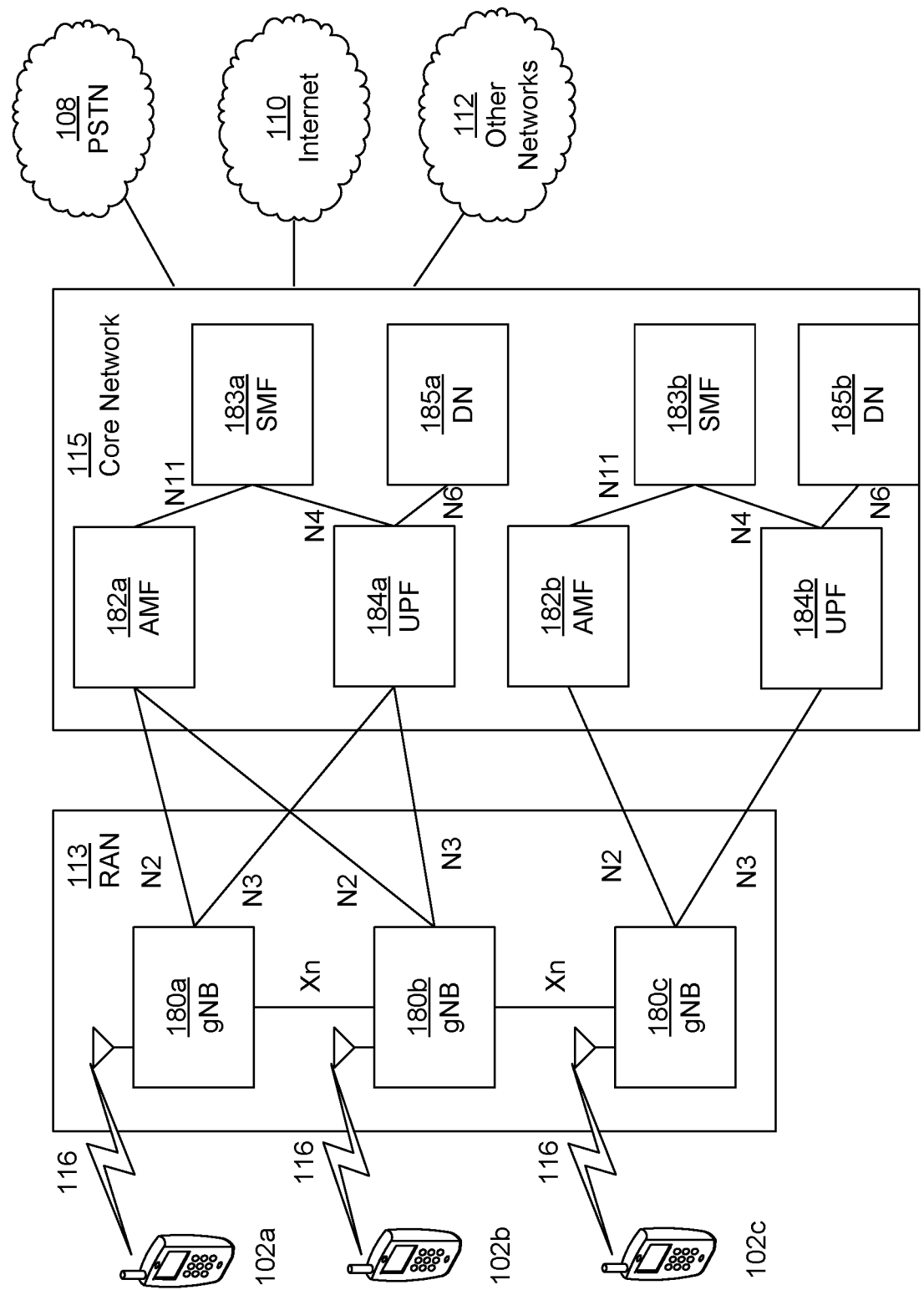
FIG. 29D is a system diagram illustrating a further example RAN and a further example CN that may be used within the communications system illustrated in FIG. 29A according to an embodiment.

FIG. 29D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (ills) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 29D, the gNBs 180a, 180b, 180c may communicate with one another over an Xn interface.

The CN 115 shown in FIG. 29D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

Systems, methods and instrumentalities have been disclosed for a shared data channel. Functional blocks and processing flow for 5G data channels may be implemented with a unified architecture for uplink and downlink. Information-carrying filler bits may be utilized in code blocks.

Uplink and downlink signal processing chains may be variable to accommodate a variety of selectable channel codes, URLLC data insertion and traffic prioritization, hybrid beamforming and waveform selection. Data (e.g., low-latency data such as URLLC) may be inserted into an ongoing transmission (e.g., low-priority such as eMBB). Low-latency traffic may take over resources allocated for other traffic, for example, by one or more of puncturing, superpositioning and multi-user MIMO transmission. Blind decoding may be implemented by an eMBB WTRU and a URLLC WTRU. Uplink grantless (e.g., random-access) URLLC transmission may be multiplexed with (e.g., scheduled) uplink eMBB transmission (e.g., from other WTRUs). Sub-slot MU/SU MIMO switching may be provided.

What is claimed:

1. A wireless transmit/receive unit (WTRU), comprising:
a processor configured to:
monitor for a first downlink control information (DCI) in a first search space of a first slot, wherein the first DCI has a first format and is associated with a first radio network temporary identifier (RNTI);
monitor for a second DCI in a second search space of a second slot, wherein the second DCI has a second format and is associated with a second RNTI;
if the second DCI is detected in the second search space of the second slot, determine, based on the second DCI, that a region in a previous allocation to the WTRU does not carry data for the WTRU, wherein the previous allocation is associated with a previous transmission to the WTRU; and
decode data associated with the previous transmission using information associated with the first DCI.

2. The WTRU of claim 1, wherein the previous transmission to the WTRU is in a previous slot.

3. The WTRU of claim 1, wherein the processor is further configured to monitor for a third DCI in a third search space of the second slot, wherein the third DCI includes scheduling information for a transmission intended for the WTRU in a current slot, and wherein the third DCI is associated with the first RNTI.

4. The WTRU of claim 3, wherein the second search space and the third search space do not overlap.

5. The WTRU of claim 3, wherein the second search space and the third search space overlap.

6. The WTRU of claim 3, wherein the second search space is a common search space and the third search space is in a WTRU-specific search space.

7. The WTRU of claim 3, wherein the second DCI has a first size and the third DCI has a second size, and wherein the second size is greater than the first size.

8. The WTRU of claim 3, wherein the first RNTI and the second RNTI are different.

9. The WTRU of claim 1, wherein the region in the previous allocation comprises at least one of resource blocks or symbols.

10. A method implemented in a wireless transmit/receive unit (WTRU) associated with decoding data, the method comprising:
monitoring for a first downlink control information (DCI) in a first search space of a first slot, wherein the first DCI has a first format and is associated with a first radio network temporary identifier (RNTI);
monitoring for a second DCI in a second search space of a second slot, wherein the second DCI has a second format and is associated with a second RNTI;
if the second DCI is detected in the second search space of the second slot, determining, based on the second DCI, that a region in a previous allocation to the WTRU does not carry data for the WTRU, wherein the previous allocation is associated with a previous transmission to the WTRU; and
decoding data associated with the previous transmission using information associated with the first DCI.

11. The method of claim 10, further comprising monitoring for a third DCI in a third search space of the second slot, wherein the third DCI includes scheduling information for a transmission intended for the WTRU in a current slot, wherein the third DCI is associated with the first RNTI, and wherein the first RNTI and the second RNTI are different.

12. The method of claim 11, wherein the second search space and the third search space do not overlap or the second search space and the third search space overlap.

13. The method of claim 11, wherein the second search space is a common search space and the third search space is in a WTRU-specific search space.

14. The method of claim 11, wherein the second DCI has a first size and the third DCI has a second size, and wherein the second size is greater than the first size.

15. The method of claim 11, wherein the previous transmission to the WTRU is in a previous slot.

* * * * *

UNITED STATES PATENT AND TRADEMARK OFFICE
CERTIFICATE OF CORRECTION

PATENT NO.       : 11,121,815 B2
APPLICATION NO.  : 16/346577
DATED            : September 14, 2021
INVENTOR(S)      : Ma et al.

It is certified that error appears in the above-identified patent and that said Letters Patent is hereby corrected as shown below:

In the Specification

Column 6, Line 11: Delete "WTUR" and insert --WTRU--

Column 16, Line 62: Delete "$b_L$)" and insert --$b_L$),--

Column 17, Line 28: Delete "$c_k$" and insert --$c_K$--

Column 23, Line 29: Delete "URLL" and insert --URLLC--

Column 26, Line 23: Delete "1x," and insert --1X,--

Column 29, Lines 16-17: Delete "and or" and insert --and/or--

Column 32, Line 17: Delete "108b" and insert --180b--

Column 32, Line 39: Delete "(ills)" and insert --(TTIs)--

Column 33, Line 11: Delete "184a,184b," and insert --184a, 184b,--

Signed and Sealed this
Fourteenth Day of March, 2023

Katherine Kelly Vidal
*Director of the United States Patent and Trademark Office*